United States Patent
Dwarakanath et al.

(10) Patent No.: US 11,461,457 B2
(45) Date of Patent: Oct. 4, 2022

(54) UTILIZING MODELS TO GENERATE IDENTIFIERS THAT IDENTIFY AND PROVIDE AUTHENTICATION FOR MACHINE LEARNING MODELS

(71) Applicant: Accenture Global Solutions Limited, Dublin (IE)

(72) Inventors: Anurag Dwarakanath, Bangalore (IN); Vikrant S. Kaulgud, Pune (IN); Sanjay Podder, Thane (IN); Adam Patten Burden, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 848 days.

(21) Appl. No.: 16/367,960

(22) Filed: Mar. 28, 2019

(65) Prior Publication Data

US 2020/0311248 A1 Oct. 1, 2020

(51) Int. Cl.
*G06F 21/44* (2013.01)
*G06K 9/62* (2022.01)
*G06N 5/04* (2006.01)
*G06N 20/20* (2019.01)

(52) U.S. Cl.
CPC ......... *G06F 21/445* (2013.01); *G06K 9/6267* (2013.01); *G06N 5/046* (2013.01); *G06N 20/20* (2019.01)

(58) Field of Classification Search
CPC .. G06F 21/445; G06K 9/6267; G06K 9/6256; G06K 9/6271; G06N 5/046; G06N 20/20; G06N 3/02; G06N 20/00

USPC ......................................................... 713/168
See application file for complete search history.

(56) References Cited

U.S. PATENT DOCUMENTS

| | | | |
|---|---|---|---|
| 2018/0063265 A1* | 3/2018 | Crossley | H04L 67/535 |
| 2018/0089591 A1* | 3/2018 | Zeiler | G06F 8/65 |
| 2019/0130277 A1* | 5/2019 | Andoni | G06N 3/084 |
| 2019/0180199 A1* | 6/2019 | Bobroff | G06N 5/04 |
| 2020/0117817 A1* | 4/2020 | Chen | G06F 21/6218 |
| 2020/0184272 A1* | 6/2020 | Zhang | G06N 20/00 |
| 2020/0302234 A1* | 9/2020 | Walters | G06N 7/005 |

OTHER PUBLICATIONS

Erwan Le Merrer et al., "Adversarial Frontier Stitching for Remote Neural Network Watermarking", Nov. 6, 2017, 12 pages.
(Continued)

*Primary Examiner* — Juan A Torres
(74) *Attorney, Agent, or Firm* — Harrity & Harrity, LLP

(57) ABSTRACT

A device receives a machine learning model, model data associated with the machine learning model, and identifier generation data. The identifier generation data includes data utilized to generate identifier pairs that may be used to authenticate the machine learning model. The device selects an identifier model, for generating the identifier pairs, based on the machine learning model, the model data, and the identifier generation data. The device processes the machine learning model, the model data, and the identifier generation data, with the selected identifier model, to generate the identifier pairs and identifier pair data. The device stores the identifier pairs and the identifier pair data in one or more data structures, and utilizes the identifier pairs to identify and provide authentication for the machine learning model.

20 Claims, 16 Drawing Sheets

(56) References Cited

OTHER PUBLICATIONS

Huili Chen et al., "DeepMarks: A Digital Fingerprinting Framework for Deep Neural Networks", Apr. 10, 2018, 12 pages.
Bita Darvish Rouhani et al., "DeepSigns: A Generic Watermarking Framework for Protecting the Ownership of Deep Learning Models", May 31, 2018, 13 pages.
Model Zoo, "Discover Open Source Deep Learning Code and Pretrained Models," 88 pages, Retrieved from the Internet Apr. 19, 2019 : URL: https://modelzoo.co/.

* cited by examiner

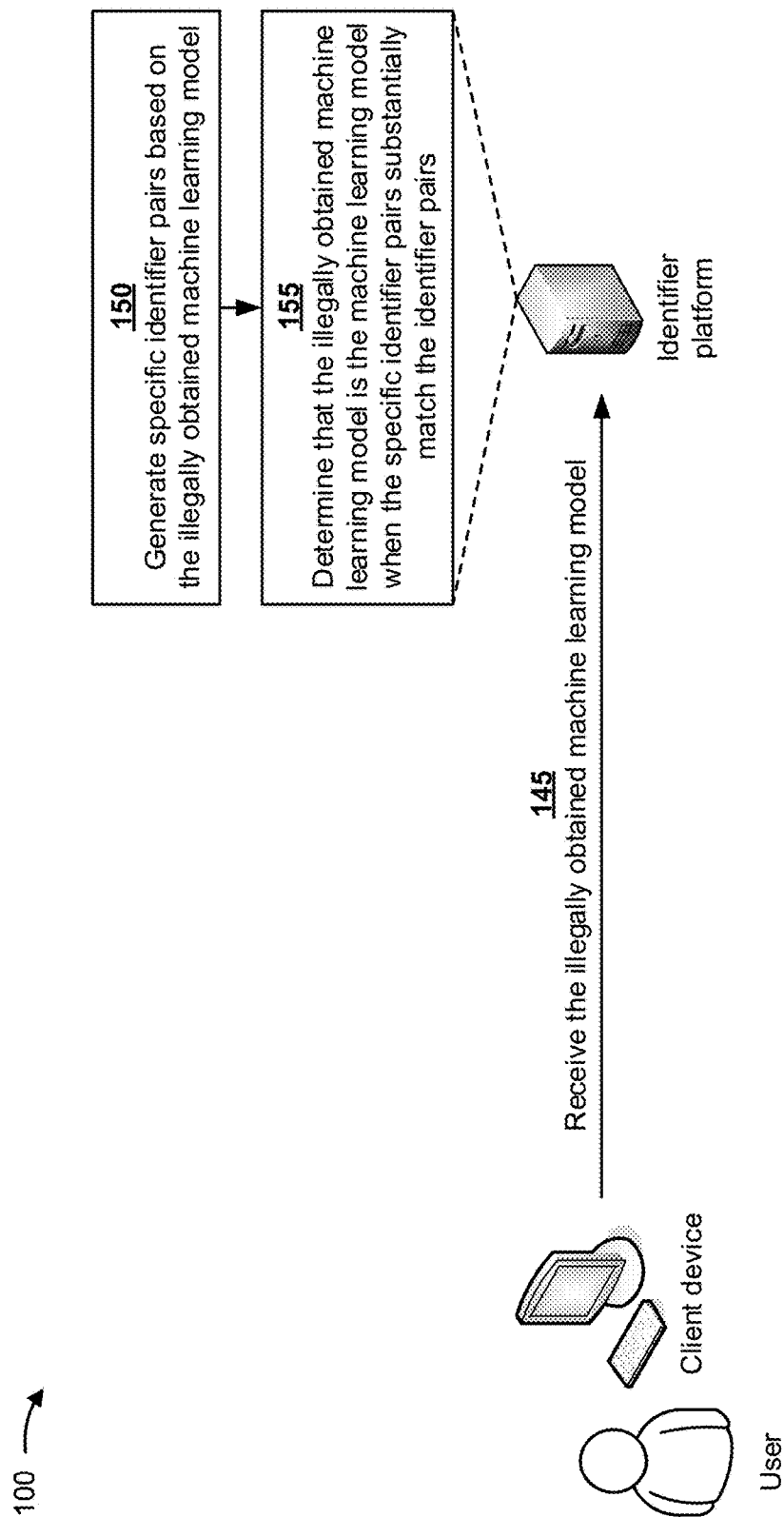

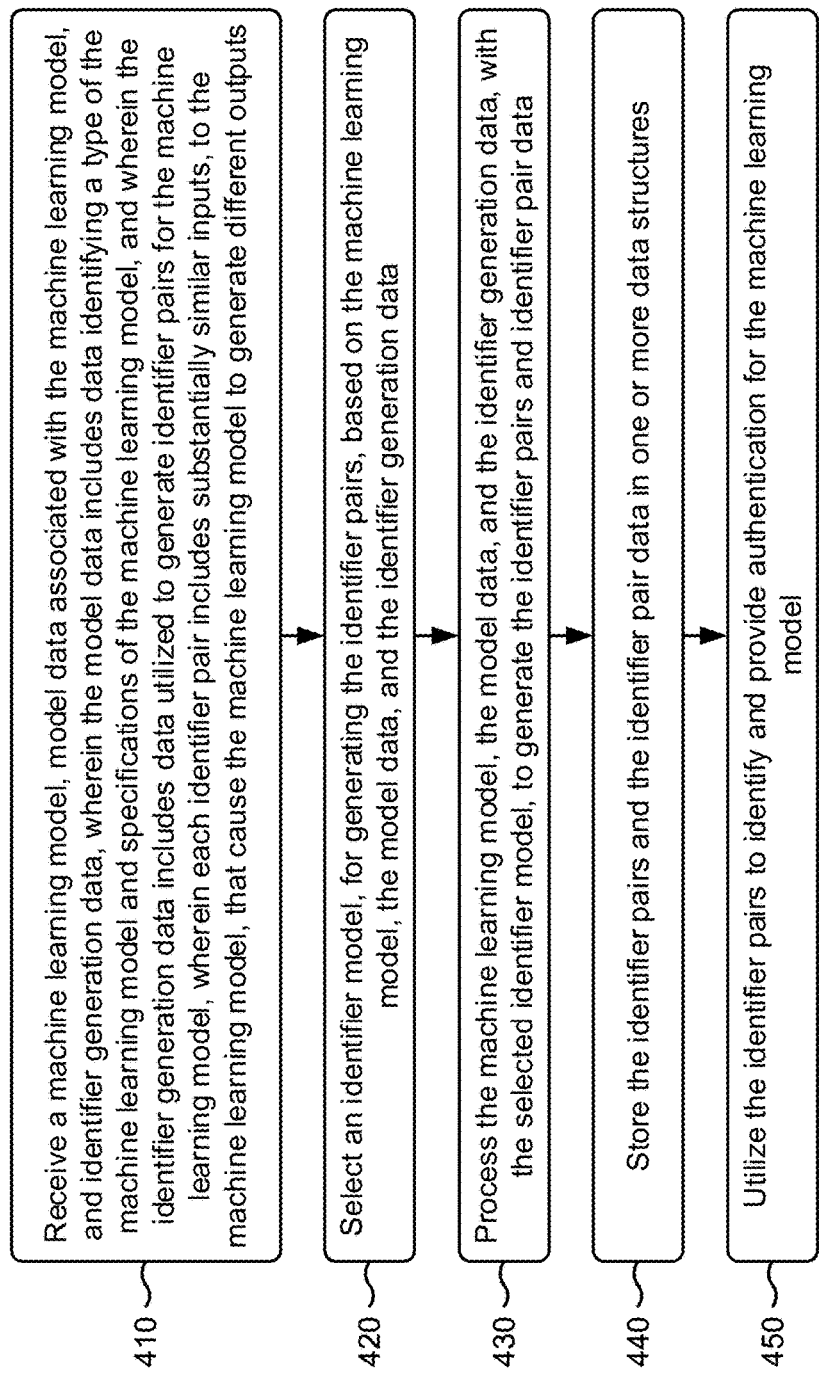

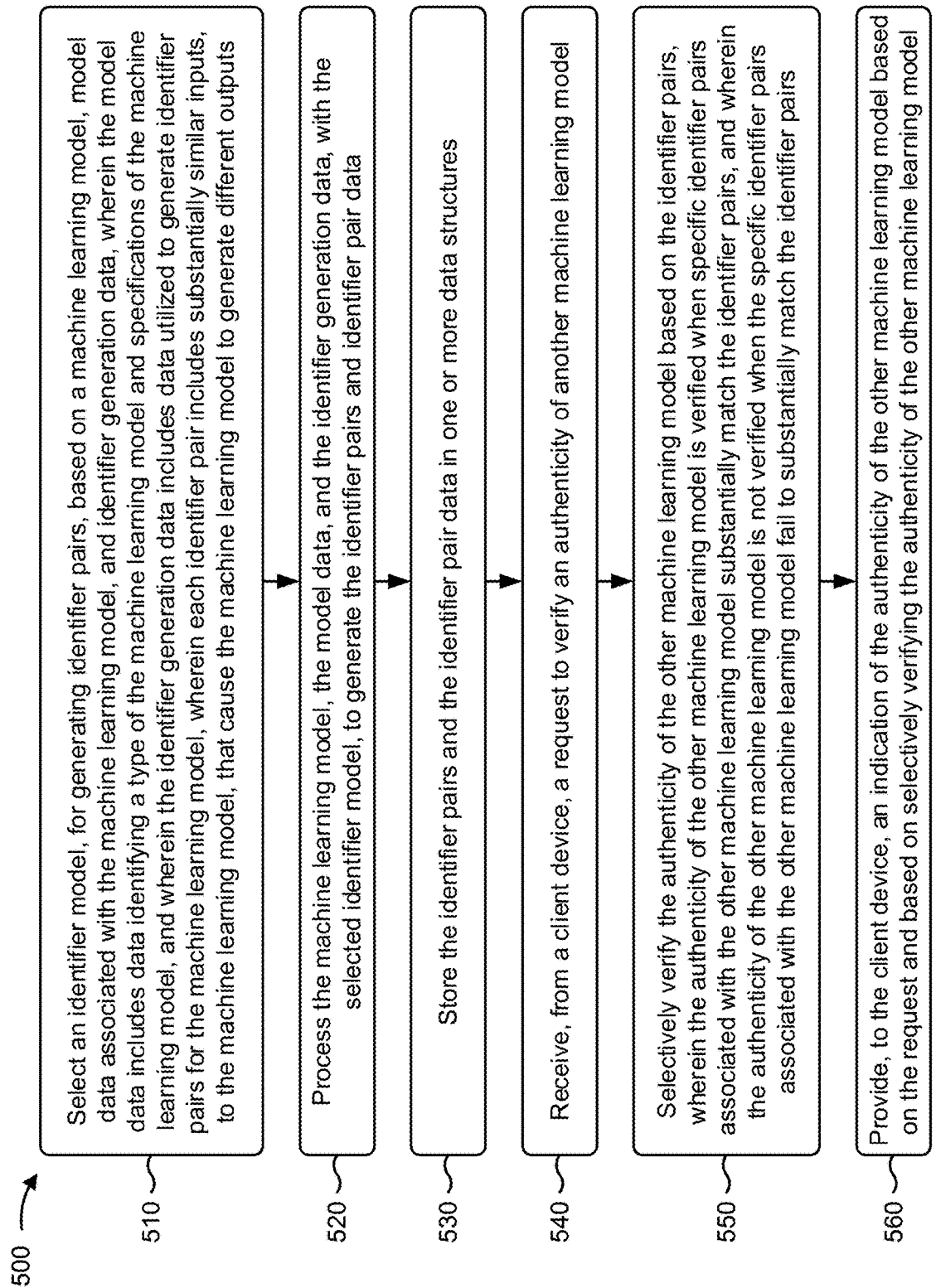

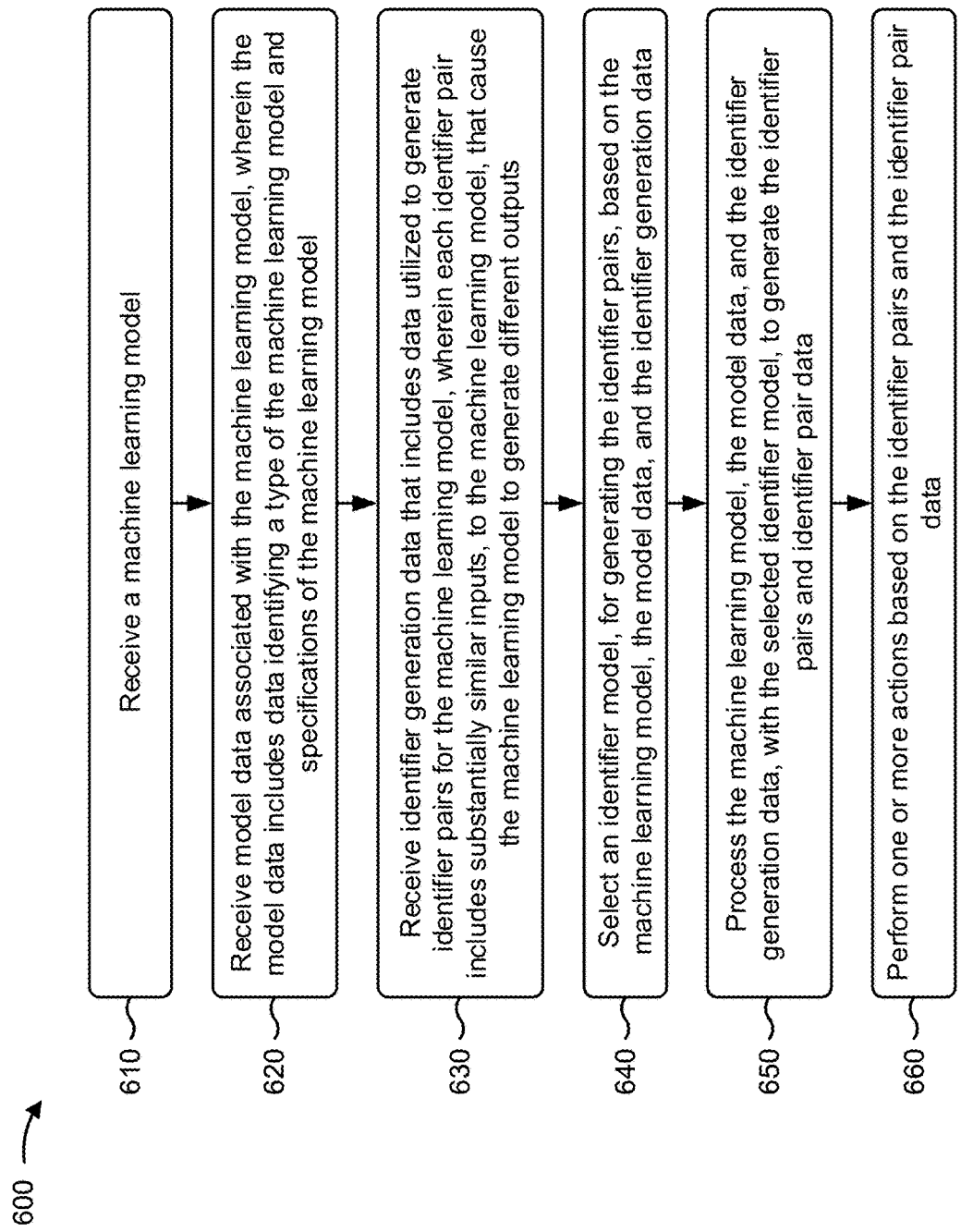

UTILIZING MODELS TO GENERATE IDENTIFIERS THAT IDENTIFY AND PROVIDE AUTHENTICATION FOR MACHINE LEARNING MODELS

BACKGROUND

Machine learning-based applications have recently shown significant practical successes, such as in computer vision, speech recognition, language translation, and/or the like. However, building a machine learning-based application is not trivial and requires specialized knowledge, specific programming skills, access to large amounts of training data, access to powerful computing resources, and/or the like. Thus, a machine learning-based application includes considerable intellectual property that should be protected.

SUMMARY

In some aspects, a method may include receiving a machine learning model, model data associated with the machine learning model, and identifier generation data. The model data may include data identifying a type of the machine learning model and specifications of the machine learning model, and the identifier generation data may include data utilized to generate identifier pairs for the machine learning model. Each identifier pair may include substantially similar inputs, to the machine learning model, that cause the machine learning model to generate different outputs. The method may include selecting an identifier model, for generating the identifier pairs, based on the machine learning model, the model data, and the identifier generation data, and processing the machine learning model, the model data, and the identifier generation data, with the selected identifier model, to generate the identifier pairs and identifier pair data. The method may include storing the identifier pairs and the identifier pair data in one or more data structures, and utilizing the identifier pairs to identify and provide authentication for the machine learning model.

In some aspects, a device may include one or more memories and one or more processors, communicatively coupled to the one or more memories, to select an identifier model, for generating identifier pairs, based on a machine learning model, model data associated with the machine learning model, and identifier generation data. The model data may include data identifying a type of the machine learning model and specifications of the machine learning model, and the identifier generation data may include data utilized to generate identifier pairs for the machine learning model. Each identifier pair may include substantially similar inputs, to the machine learning model, that cause the machine learning model to generate different outputs. The one or more processors may process the machine learning model, the model data, and the identifier generation data, with the selected identifier model, to generate the identifier pairs and identifier pair data, and may store the identifier pairs and the identifier pair data in one or more data structures. The one or more processors may receive, from a client device, a request to verify an authenticity of another machine learning model, and may selectively verify the authenticity of the other machine learning model based on the identifier pairs. The authenticity of the other machine learning model may be verified when specific identifier pairs associated with the other machine learning model substantially match the identifier pairs, and the authenticity of the other machine learning model may not be verified when the specific identifier pairs associated with the other machine learning model fail to substantially match the identifier pairs. The one or more processors may provide, to the client device, an indication of the authenticity of the other machine learning model based on the request and based on selectively verifying the authenticity of the other machine learning model.

In some aspects, a non-transitory computer-readable medium may store instructions that include one or more instructions that, when executed by one or more processors of a device, may cause the one or more processors to receive a machine learning model and receive model data associated with the machine learning model. The model data may include data identifying a type of the machine learning model and specifications of the machine learning model. The one or more instructions may cause the one or more processors to receive identifier generation data that includes data utilized to generate identifier pairs for the machine learning model. Each identifier pair may include substantially similar inputs, to the machine learning model, that cause the machine learning model to generate different outputs. The one or more instructions may cause the one or more processors to select an identifier model, for generating the identifier pairs, based on the machine learning model, the model data, and the identifier generation data. The one or more instructions may cause the one or more processors to process the machine learning model, the model data, and the identifier generation data, with the selected identifier model, to generate the identifier pairs and identifier pair data, and perform one or more actions based on the identifier pairs and the identifier pair data.

BRIEF DESCRIPTION OF THE DRAWINGS

FIGS. 1A-1K are diagrams of one or more example implementations described herein.

FIGS. 4-6 are flow charts of example processes for utilizing models to generate identifiers that identify and provide authentication for machine learning models.

DETAILED DESCRIPTION

Figure 1A:
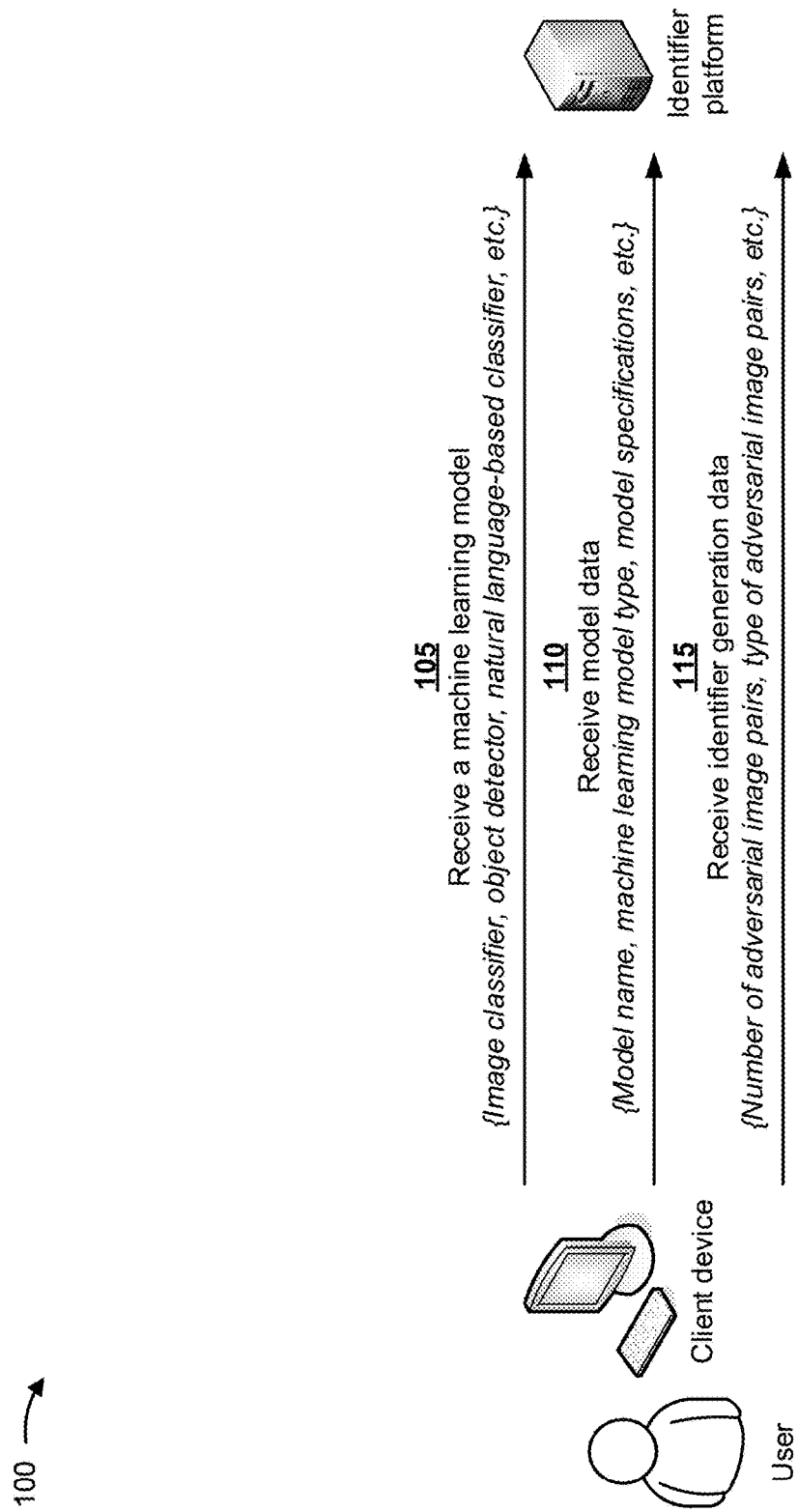

The following detailed description of example implementations refers to the accompanying drawings. The same reference numbers in different drawings may identify the same or similar elements.

A machine learning-based application may include a trained machine learning model and wrapper code for the application. The trained machine learning model is the core of the application and may include a computation graph (e.g., analogous to a control flow of the application) and a set of parameter values (e.g., analogous to conditions based on which a path in the control flow is taken). The wrapper code pre-processes an input before feeding the input into the trained machine learning model.

When a machine learning-based application is provided (e.g., sold, leased, etc.) to a customer or given away (e.g., via open source code) with a license, the trained machine learning model is typically made available. Unfortunately, it is almost impossible to prevent the trained machine learning model from being further given away or re-sold. Thus, intellectual property infringement of the trained machine learning model typically cannot be detected.

A lack of integrity checks for the trained machine learning model also allows a malicious party to sell a different machine learning model (e.g., a cheaper version of the machine learning model) and claim that the different machine learning model is owned by the original party. Furthermore, when the trained machine learning model is provided to an application developer, the application developer may significantly modify the machine learning model (e.g., lessen the integrity of the machine learning model) and incorporate the modified machine learning model in an application. Theft and/or modification of a machine learning model wastes computing resources (e.g., processing resources, memory resources, and/or the like), networking resources, and/or the like that were utilized to create the machine learning model. Furthermore, computing resources, networking resources, and/or the like are wasted determining whether the machine learning model has been stolen and/or modified, and may not be able to make such a determination.

Some implementations described herein provide an identifier platform that utilizes methods to generate identifiers that identify and provide authentication for machine learning models. For example, the identifier platform may receive a machine learning model and model data associated with the machine learning model, where the model data includes data identifying a type of the machine learning model and specifications of the machine learning model. The identifier platform may receive identifier generation data that includes data utilized to generate identifier pairs for the machine learning model, where each identifier pair includes similar inputs, to the machine learning model, that cause the machine learning model to generate different outputs. The identifier platform may select an identifier model, for generating the identifier pairs, based on the machine learning model, the model data, and the identifier generation data, and may process the machine learning model, the model data, and the identifier generation data, with the selected identifier model, to generate the identifier pairs and identifier pair data. The identifier platform may perform one or more actions (e.g., identify a stolen or misappropriated machine learning model, determine that a machine learning model has been significantly altered, and/or the like) based on the identifier pairs and the identifier pair data.

In this way, the identifier platform automatically generates identifiers that identify and provide authentication for machine learning models, ensures integrities of machine learning models incorporated into applications, and/or the like. Thus, the identifier platform enables a creator of a machine learning model to determine whether the machine learning model has been stolen or modified. This conserves computing resources, networking resources, and/or the like that would otherwise be wasted attempting to determine whether the machine learning model has been stolen and/or modified. Furthermore, if theft and modification of the machine learning model are deterred, computing resources, networking resources, and/or the like utilized to create the machine learning model are not wasted.

FIGS. 1A-1K are diagrams of one or more example implementations 100 described herein. As shown in FIG. 1A, a user may be associated with a client device and an identifier platform. The user may utilize the client device to create a machine learning model, to retrieve a machine learning model from another device (e.g., a server device), and/or the like. As further shown in FIG. 1A, and by reference number 105, the identifier platform may receive, from the client device, the machine learning model. In some implementations, the machine learning model may include a deep neural network model, an image classifier model, an object detector model, a natural language-based classifier model, a time series forecaster model, and/or the like.

As further shown in FIG. 1A, and by reference number 110, the identifier platform may receive model data from the client device. In some implementations, the model data may include data identifying a model name of the machine learning model, a machine learning model type (e.g., a deep neural network model, an image classifier model, an object detector model, a natural language-based classifier model, a time series forecaster model, and/or the like), a name of a developer of the machine learning model, model specifications for the machine learning model (e.g., a training data source, a training data license, a training data version, a location of hardware associated with training the machine learning model, etc.), and/or the like. The model data may be referred to as engineering metadata for the machine learning model.

As further shown in FIG. 1A, and by reference number 115, the identifier platform may receive identifier generation data from the client device. In some implementations, the identifier generation data may include data utilized by the identifier platform to generate identifier pairs for the machine learning model, as described below. An identifier pair includes an input to the machine learning model and an output generated by the machine learning model based on the input. In some implementations, the identifier pairs may include substantially similar inputs, to the machine learning model, that cause the machine learning model to generate different outputs, as described below. For example, an identifier pair may include a first set that includes a first input to the machine learning model and a first output (e.g., a first class label) generated by the machine learning model based on the first input, and may include a second set that includes a second input to the machine learning model and a second output (e.g., a second class label) generated by the machine learning model based on the second input. The first input and the second input may be substantially similar (e.g., when a predetermined threshold is satisfied), and the first class label and the second class label may be different (e.g., when another predetermined threshold is not satisfied).

In some implementations, if the machine learning model is an image classifier model, the identifier generation data may include data identifying a quantity of image pairs to input to the machine learning model, types associated with the image pairs, a quantity of steps to optimize image outputs of the machine learning model, a learning rate associated with optimizing the image outputs, and/or the like.

Figure 1B:
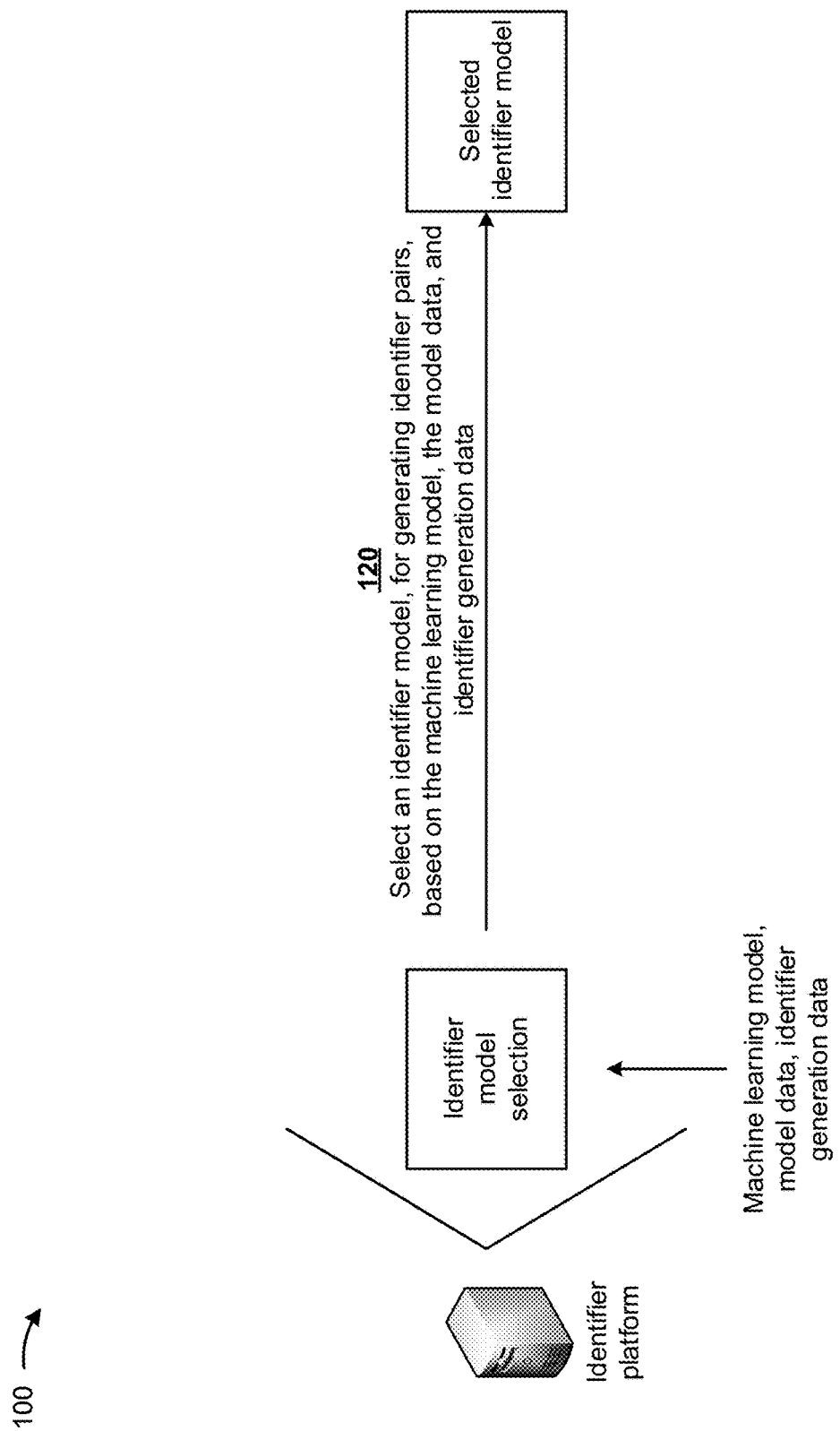

As shown in FIG. 1B, and by reference number 120, the identifier platform may select, from multiple identifier models, an identifier model for generating the identifier pairs, based on the machine learning model, the model data, and the identifier generation data. In some implementations, the identifier model, by which the identifier pairs may be generated, may be selected based on the type of machine learning model (e.g., a deep neural network model, an image classifier model, an object detector model, a natural language-based classifier model, a time series forecaster model, and/or the like). For example, if the machine learning model is an image classification model, the identifier platform may select an identifier model that functions well with an image classification model (e.g., a gradient ascent model, a loss function model, and/or the like). If the machine learning model another type of model, the identifier platform may select an identifier model that functions well with the other type of model.

Figure 1C:
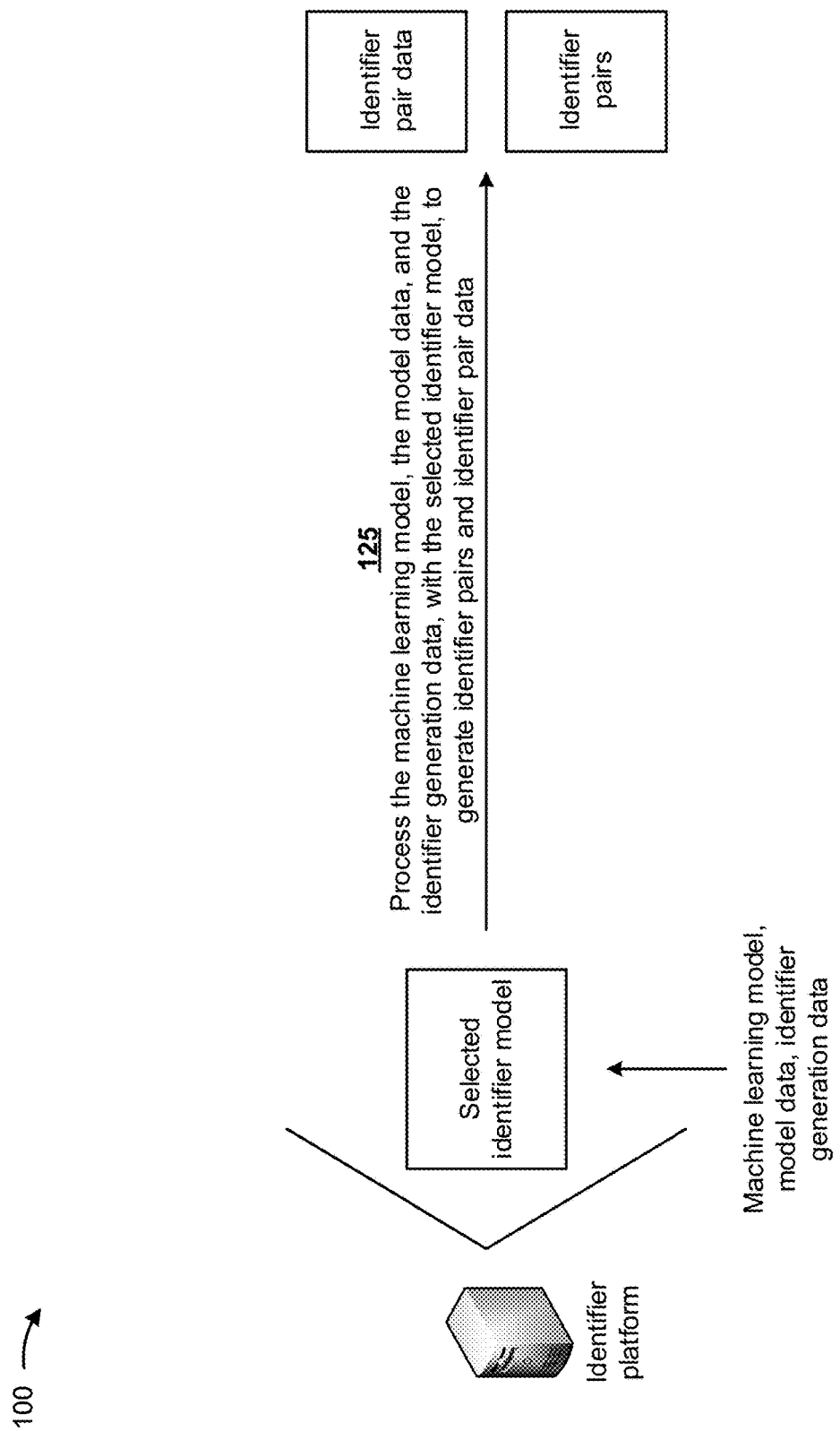

As shown in FIG. 1C, and by reference number 125, the identifier platform may process the machine learning model, the model data, and the identifier generation data, with the selected identifier model, to generate identifier pairs and identifier pair data. In some implementations, an identifier pair, of the identifier pairs, may include a first set that includes a first input ($X_a$) and a first class label ($y_a$) generated by the machine learning model based on the first input to the machine learning model, and a second set that includes a second input ($X_b$) and a second class label ($y_b$) generated by the machine learning model based on the second input to the machine learning model. The first input and the second input may be substantially similar (e.g., $X_a \approx X_b$), and the first class label and the second class label may be different (e.g., $y_a \neq y_b$). An example of the identifier pairs is provided below in connection with FIG. 1E.

In some implementations, the selected identifier model may include a model that generates the identifier pairs. For example, the selected identifier model may be a gradient ascent model that utilizes gradient ascent. Gradient ascent is an iterative optimization method that identifies a local maximum of a function by taking steps proportional to a positive of a gradient of the function. In this case, the selected identifier model may utilize gradient ascent to identify pairs of substantially similar inputs (e.g., images) on either side of a decision boundary that separates different outputs of the machine learning model (e.g., image classifications) based on similar inputs.

As another example, the selected identifier model may be a loss function model that builds an optimization problem, associated with substantially similar inputs and different outputs, through an appropriately defined loss function. In some implementations, the loss function model may employ an optimization technique, such as an ADAM optimizer (e.g., a model for first-order gradient-based optimization of stochastic objective functions, based on adaptive estimates of lower-order moments).

In applying the selected identifier model (e.g., the gradient ascent model or the loss function model) to generate identifier pairs associated with, for example, an image classifier model, the identifier pairs may be initialized with random values (e.g., values that represent pixels as real numbers between zero and one). Alternatively, the identifier pairs may be initialized with known values in a test set of the machine learning model, such as actual images utilized by an image classifier model. The inputs in the identifier pairs (e.g., image (e.g., $X_a$, $X_b$)) may adhere to constraints of an image, but enforcing such constraints may be difficult in standard optimization techniques. In some implementations, auxiliary variables ($X_a^{aux}$, $X_b^{aux}$), may utilized to generate identifier pairs as:

$$X_a = \tfrac{1}{2}(\tan h(X_a^{aux}) + 1)$$

$$X_b = \tfrac{1}{2}(\tan h(X_b^{aux}) + 1). \quad (1)$$

The tan h function may be between −1 and 1 and Equation 1 may ensure that a constraint of 0 and 1 is enforced on the images. In terms of optimization, the problem becomes to change the auxiliary variables ($X_a^{aux}$, $X_b^{aux}$) such that $X_a \approx X_b$ and $y_a \neq y_b$. There are two variants for each of the two models (e.g., the gradient ascent model and the loss function model). In the gradient ascent model, the identifier platform may initialize the image (e.g., $X_a$, $X_b$) with random values between 0 and 1. In the loss function model, the identifier platform may initialize the image (e.g., $X_a$, $X_b$) with actual images available in a test set of the machine learning model.

In some implementations, the identifier platform may implement the gradient ascent model utilizing the following syntax:

Input: Given $h_\theta(\ )$ and a few examples $X^{test} = \{X_{test}^1, X_{test}^2, \ldots, X_{test}^n\}$, where n is the number of identifier pairs to generate, a learning rate constant r, maximum number of optimization steps to perform G and whether to initialize identifier pairs with random values or real images.

---

Output: $k_1 = \{(X_a^1, y_a^1), (X_b^1, y_b^1)\}$; $k_2 = \{(X_a^2, y_a^2), (X_b^2, y_b^2)\}$; ...
$k_n = \{(X_a^n, y_b^n), (X_b^n, y_b^n)\}$
Define auxiliary variables $X_a^{aux}$ and $X_b^{aux}$ of a same shape as $X_a$ and $X_b$
for i = 1 to n do
   Define $X_a^i = \tfrac{1}{2}(\tanh(X_a^{aux}) + 1)$
   Define $X_b^i = \tfrac{1}{2}(\tanh(X_b^{aux}) + 1)$
   if initialized identifier pairs with random values = True then
     initialize $X_b^{aux}$ randomly between 0 and 1
     $y_a^i = h_\theta(X_b^i)$
   end
   else
     initialize $X_b^{aux} = 2 * \tanh^{-1}(X_{test}^i - 1)$
     $y_a^i = h_\theta(X_{test}^i)$
   end
   Randomly choose class $y_b^i \neq y_a^i$
   Define SoftmaxScore$_{y_b}^i$ = Probability in $h_\theta(\ )$ of class $y_b^i$
   Define SoftmaxScore$_{y_a}^i$ = Probability in $h_\theta(\ )$ of class $y_a^i$
   while numOfSteps < G do
     $\Delta$ = Gradient of SoftmaxScore$_{y_b}^i$ w.r.t. $X_b^{aux}$
     $X_b^{aux} = X_b^{aux} + r * \Delta$
     if $h_\theta(X_b^i) == y_b^i$ then
       break
     numOfSteps ++
   end
   $X_a^{aux} = X_b^{aux}$
   while numOfSteps < G do
     $\Delta$ = Gradient of SoftmaxScore$_{y_a}^i$ w.r.t. $X_a^{aux}$
     $X_a^{aux} = X_a^{aux} + r * \Delta$
     if $h_\theta(X_a^i) == y_a^i$ then
       break
     numOfSteps ++
   end
   $k_i = \{(X_a^i, y_a^i), (X_b^i, y_b^i)\}$
end.

---

The loss function model may formulate an explicit loss function and may utilize an optimizer (e.g., ADAM). The identifier platform may formulate a loss function as an objective of an optimization as shown in Equation 2 (below). The loss function may include a cross entropy loss between what the loss function model predicts (e.g., $h_\theta(X_a)$) and what is needed to be predicted ($y_a$). The loss function may include a distance between two images of an identifier pair (e.g., Distance($X_a$, $X_b$)). The identifier platform may utilize a factor (C) to emphasize class outputs (e.g., $y_a \neq y_b$). The loss function (e.g., Equation 2) may be calculated as follows:

$$L = C*(\text{cross\_entropy\_loss}(y_a, h_\theta(X_a)) + \text{cross\_entropy}_{loss}(y_b, h_\theta(X_b))) + \text{Distance}(X_a, X_b) \quad (2)$$

Fully specifying the loss function generates Equation 3, where $\| \ldots \|^2$ denotes an L2 distance:

$$L = C * \left( -\log\left( \frac{e^{h_\theta(X_a)^{y_a}}}{\sum_{\forall i} e^{h_\theta(X_a)^i}} \right) - \log\left( \frac{e^{h_\theta(X_b)^{y_b}}}{\sum_{\forall i} e^{h_\theta(X_b)^i}} \right) \right) + \|X_a, X_b\|^2 \quad (3)$$

In some implementations, the identifier platform may implement the gradient ascent model utilizing the following syntax:

Input: Given $h_\theta(\ )$ and a few examples $X^{test} = \{X_{test}^1, X_{test}^2, \ldots, X_{test}^n\}$, where n is the number of identifier pairs to generate, a constant C and a maximum number of optimization steps to perform G and whether to initialize identifier pairs with random values or real images.

---

Output: $k_1 = \{(X_a^1, y_a^1), (X_b^1, y_b^1)\}$; $k_2 = \{(X_a^2, y_a^2), (X_b^2, y_b^2)\}$; ...
$k_n = \{(X_a^n, y_b^n), (X_b^n, y_b^n)\}$
Define auxiliary variables $X_a^{aux}$ and $X_b^{aux}$ of a same shape as $X_a$ and $X_b$
for i = 1 to n do
    Define $X_a^i = \frac{1}{2}(\tanh(X_a^{aux}) + 1)$
    Define $X_b^i = \frac{1}{2}(\tanh(X_b^{aux}) + 1)$
    if initialized identifier pairs with random values = True then
        initialize $X_a^{aux}$ randomly between 0 and 1
        $y_a^i = h_\theta(X_a^i)$
        initialize $X_b^{aux} = X_a^{aux}$
    end
    else
        initialize $X_a^{aux} = 2 * \tanh^{-1}(X_{test}^i - 1)$
        $y_a^i = h_\theta(X_{test}^i)$
        initialize $X_b^{aux} = X_a^{aux}$
    end
    Randomly choose class $y_b^i \neq y_a^i$
    Define L = C * (cross_entropy_loss $(y_a^i, h_\theta(X_a^i))$ +
    cross_entropy$_{loss}(y_b^i, h_\theta(X_b^i))$) + Distance $(X_a^i, X_b^i)$
    while numOfSteps < G do
        minimize L w.r.t. $X_a^{aux}$ and $X_b^{aux}$
        numOfSteps ++
    end
    $k_i = \{(X_a^i, y_a^i), (X_b^i, y_b^i)\}$
end.

---

Figure 1D:
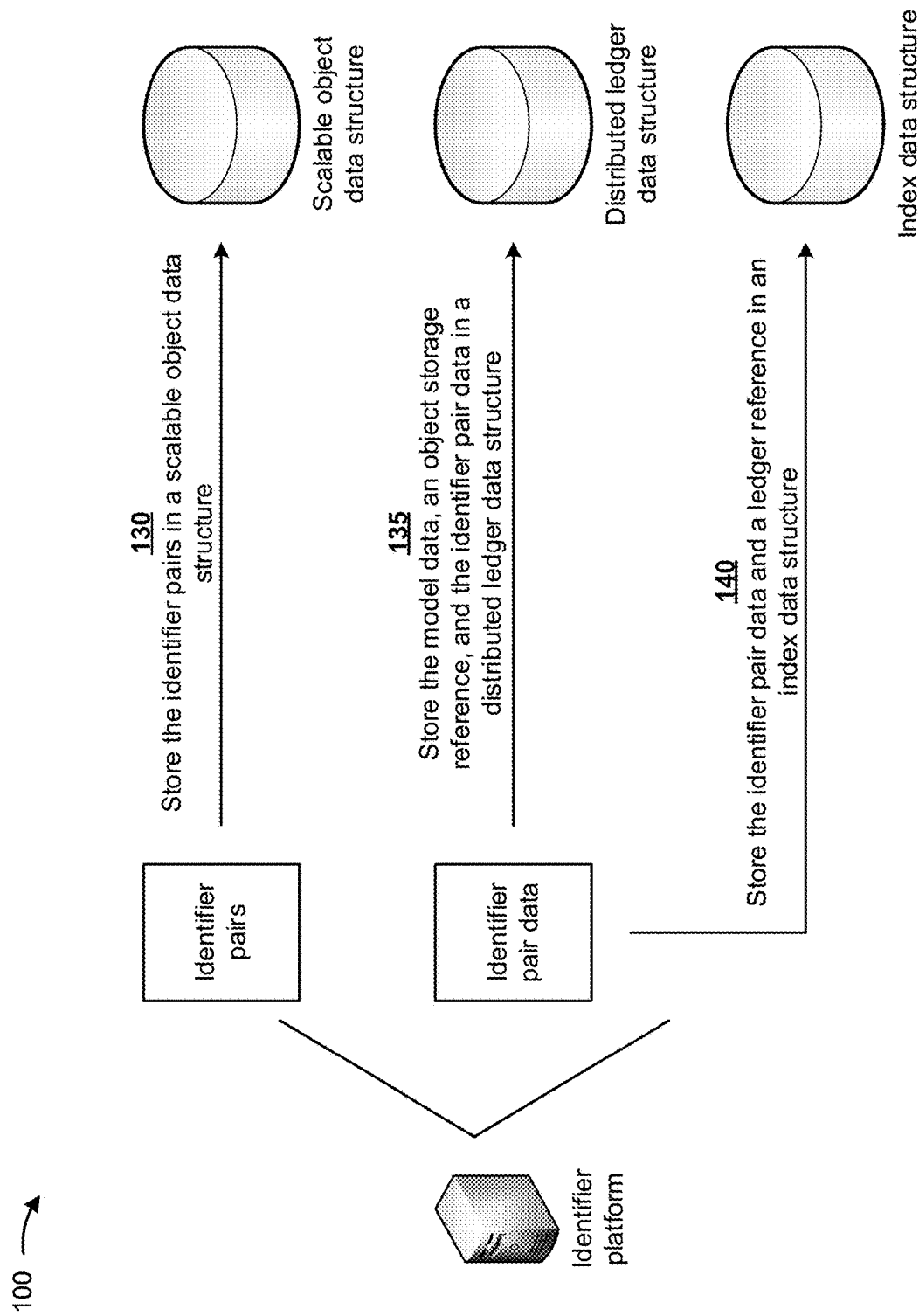

As shown in FIG. 1D, and by reference number 130, the identifier platform may store the identifier pairs in a scalable object data structure (e.g., a database, a table, a list, and/or the like). In some implementations, since the identifier pairs may consume a large quantity of bytes of storage, the identifier pairs may be stored in the scalable object data structure. The scalable object data structure may be scalable to accommodate large files, and may organize the identifier pairs into containers of flexible sizes, referred to as objects. In this way, the identifier platform may conserve memory resources associated with storing large files, such as the identifier pairs.

As further shown in FIG. 1D, and by reference number 135, the identifier platform may store the model data, an object storage reference, and the identifier pair data in a distributed ledger data structure (e.g., a database, a table, a list, and/or the like). In some implementations, the object storage reference may include a reference to a location of the identifier pairs in the scalable object data structure. The distributed ledger data structure may include replicated, shared, and synchronized data that is geographically spread across multiple locations.

As further shown in FIG. 1D, and by reference number 140, the identifier platform may store the identifier pair data and a ledger reference in an index data structure (e.g., a database, a table, a list, and/or the like). In some implementations, the ledger reference may include a reference to a location of the model data, the object storage, and the identifier pair data in the distributed ledger data structure. The index data structure may improve a speed of data retrieval operations associated with the scalable object data structure and/or the distributed ledger data structure, which may conserve computing resources, networking resources, and/or the like that would otherwise be wasted performing data retrieval operations.

In this way, the identifier platform may handle thousands, millions, billions, and/or the like, of machine learning models, identifier pairs, and/or the like within a period of time (e.g., daily, weekly, monthly), and thus may provide "big data" capability.

Figure 1E:
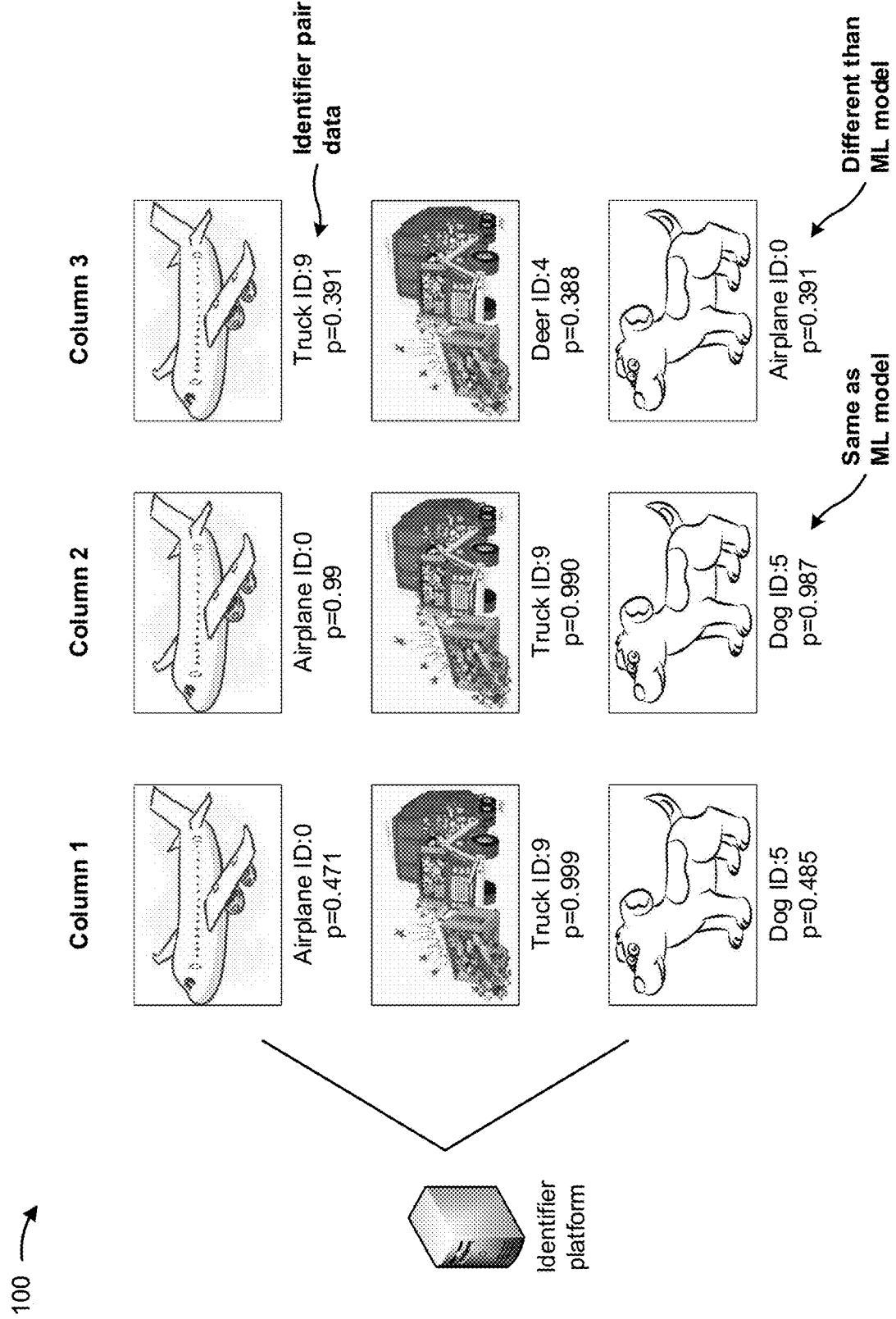

FIG. 1E provides an example of identifier pairs that may be generated by the identifier platform for an image classifier machine learning model. As shown, the first column may include input images to the machine learning model and output class labels generated by the machine learning model based on the input images. For example, the input images may include an image of an airplane, an image of a truck, and an image of a dog. The output class labels may include an airplane class label, a truck class label, a dog class label, and probabilities (p) associated with the class labels (e.g., probabilities that the class labels are accurate).

The second column may include first identifier pairs that include first inputs $(X_a)$ and first class labels $(y_a)$ generated by the selected identifier model based on the first inputs. For example, the first inputs may include the image of the airplane, the image of the truck, and the image of the dog. The first class labels may include the airplane class label, the truck class label, the dog class label, and probabilities (p) associated with the first class labels.

The third column may include second identifier pairs that include second inputs $(X_b)$ and second class labels $(y_b)$ generated by the selected identifier model based on the second inputs. For example, the second inputs may include the image of the airplane, the image of the truck, and the image of the dog. The second class labels may include the truck class label, a deer class label, the airplane class label, and probabilities (p) associated with the second class labels. The first inputs and the second inputs may be substantially similar (e.g., $X_a \approx X_b$) since the input images correspond with a same initial image. However, the first class labels and the second class labels may be different (e.g., $y_a \neq y_b$) since the first class labels and the second class labels do not match.

Figure 1F:
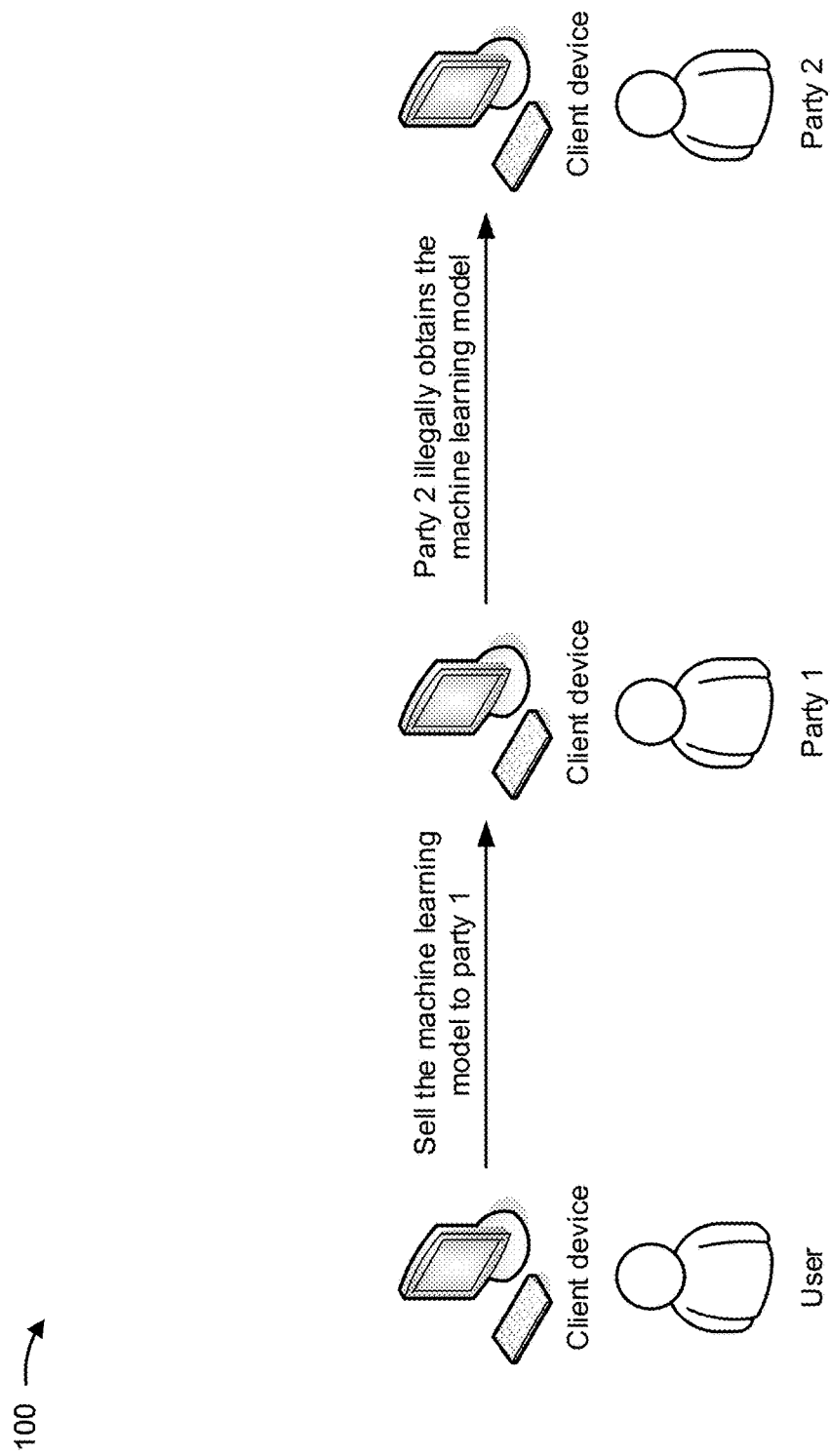

As shown in FIG. 1F, a user of the client device (e.g., a creator of a machine learning model) may sell the machine learning model to a first party (e.g., party 1). For example, a developer of the machine learning model may sell the machine learning model to the first party with the intention of the machine learning model being used by the first party, but not used by other parties. A second party (e.g., party 2) may illegally obtain the machine learning model from the first party. For example, the second party may obtain the machine learning model without the consent of the first party, the first party may provide the machine learning model to the second party without the consent of the user, and/or the like. Because the identifier platform has, as described above, generated and stored identifier pairs associated with the machine learning model sold by the user, the identifier pairs can be used to determine that the illegally obtained machine learning model is the machine learning model sold by the user.

As shown in FIG. 1G, and by reference number 145, the identifier platform may receive the illegally obtained machine learning model. For example, the user may obtain the illegally obtained machine learning model through a legal proceeding (e.g., a lawsuit, such as an intellectual property lawsuit), and may provide, via the client device, the illegally obtained machine learning model to the identifier platform. In some implementations, the user (e.g., via the client device) may provide, to the identifier platform, information instructing the identifier platform to generate specific identifier pairs based on the illegally obtained machine learning model and to compare the specific identifier pairs with the identifier pairs. As further shown in FIG. 1G, and by reference number 150, the identifier platform may generate specific identifier pairs based on the illegally obtained machine learning model. For example, the identifier platform may generate the specific identifier pairs in a manner described above in connection with FIGS. 1B and 1C. As further shown in FIG. 1G, and by reference number 155, the identifier platform may determine that the illegally obtained machine learning model is the user's machine learning model when the specific identifier pairs substantially match the identifier pairs. In some implementations, the identifier platform may determine the authenticity of the illegally obtained machine learning model without reviewing code associated with the illegally obtained machine learning model.

As a particular example, the machine learning model may be an image classifier model, as described above. In this case, the user may have utilized the identifier platform to generate identifier pairs of inputs (e.g., images) and outputs (e.g., class labels identifying the subject matter of the images), and to store the identifier pairs, before providing the image classifier model to the first party. After the second party illegally obtains the image classifier model, the identifier platform may determine that the illegally obtained machine learning model is the machine learning model provided to the first party. For example, the identifier platform may compare pairs of class labels produced based on the illegally obtained machine learning model and pairs of class labels previously produced by the identifier platform based on substantially same input images, and may determine that a threshold percentage of the pairs of class labels produced based on the illegally obtained machine learning model are the same as the pairs of class labels previously produced by the identifier platform.

In this way, the identifier platform may provide certain inputs to a trained machine learning model and may determine outputs based on the inputs. The inputs and the outputs may create a signature (e.g., the identifier pairs) for the machine learning model because no other model would have the exact same outputs for these inputs (e.g., because no other model would be trained on the same training set of data). The identifier platform may verify a particular model by providing the same inputs to the particular model and determining whether substantially the same outputs are generated by the model. If the outputs are substantially the same, then the particular model matches the machine learning model. If the outputs are different, then the particular model fails to match the machine learning model.

Figure 1H:
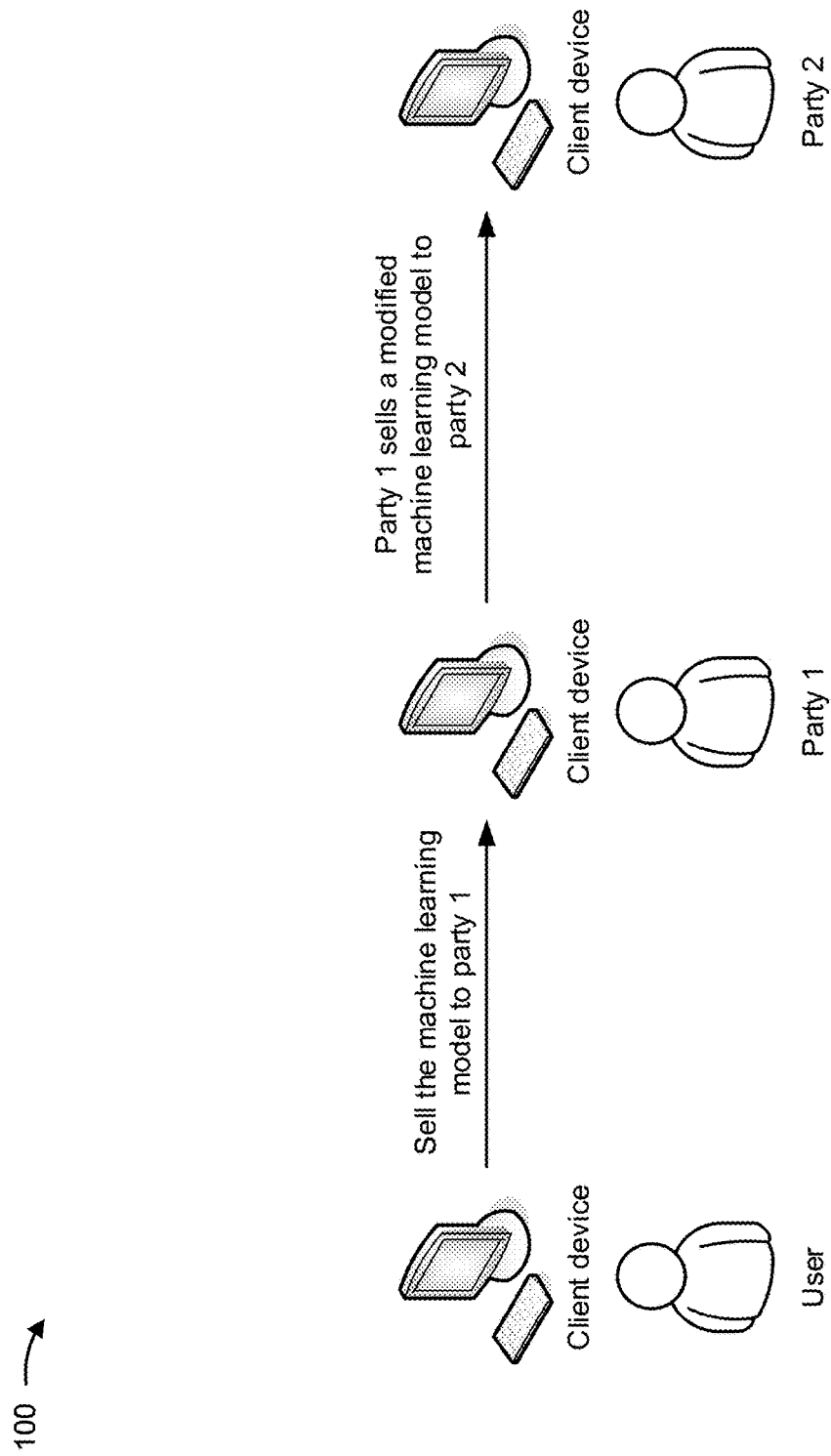

As shown in FIG. 1H, a user of the client device (e.g., a creator of a machine learning model) may sell the machine learning model to a first party (e.g., party 1). For example, a developer of a machine learning model may sell the machine learning model to the first party with the intention of the machine learning model not being modified by the first party or resold to other parties. In this case, assume that the first party sells a modified machine learning model to a second party (e.g., party 2). For example, the first party may sell a machine learning model that is inferior (e.g., less sophisticated, less accurate, less effective, or the like) compared to the machine learning model sold by the user, and may claim that the inferior machine learning model is the same as the machine learning model sold by the user. Because the identifier platform has, as described above, generated and stored identifier pairs associated with the machine learning model sold by the user, the identifier pairs can be used to determine that the modified machine learning model sold by the first party is not the same as the machine learning model sold by the user.

Figure 1I:
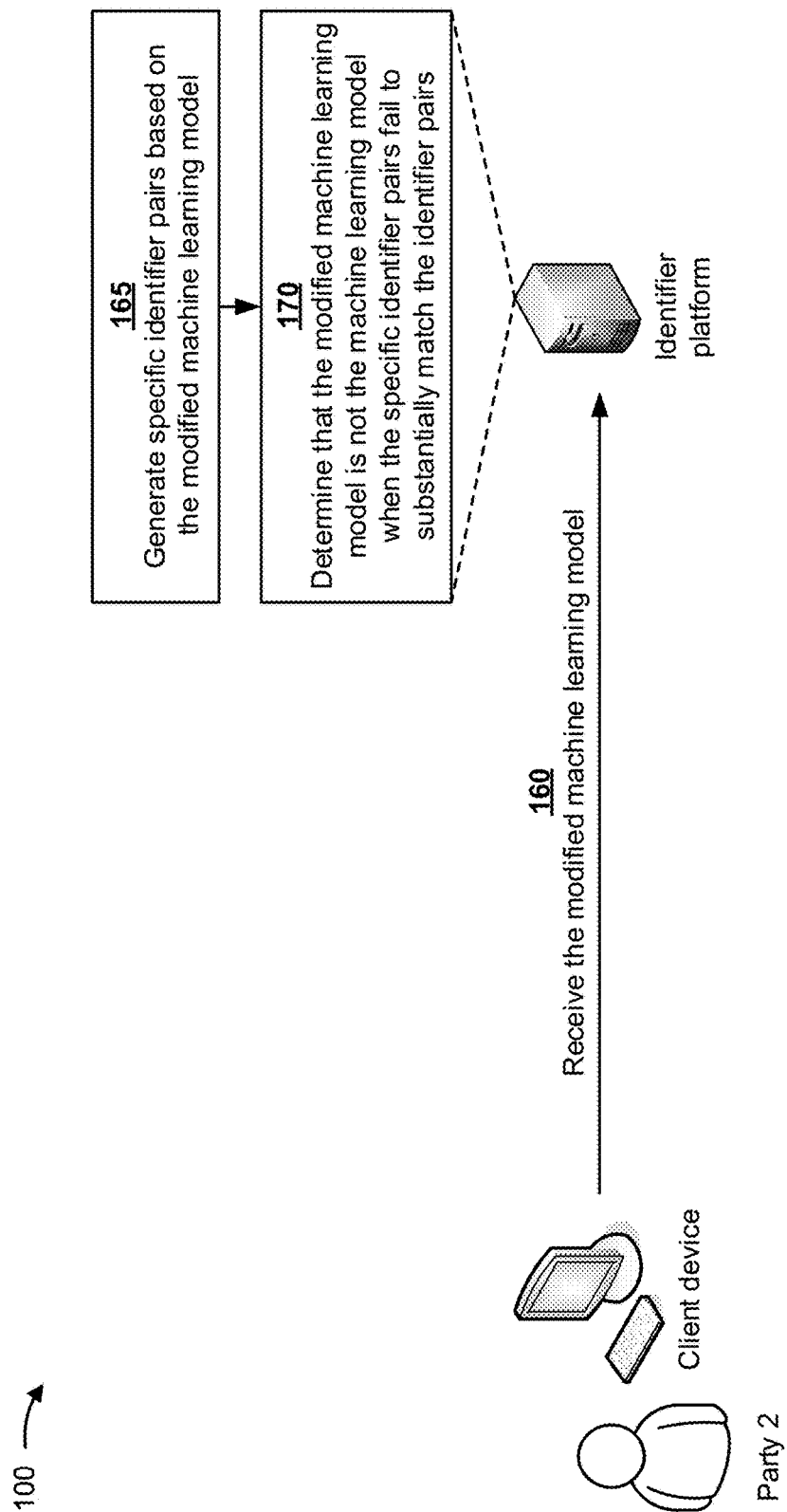

As shown in FIG. 1I, and by reference number 160, the identifier platform may receive the modified machine learning model. For example, the second party may provide, via the client device, the modified machine learning model to the identifier platform in order to verify that the modified machine learning model is the machine learning model (e.g., and not an inferior knockoff). In some implementations, the second party (e.g., via the client device) may provide, to the identifier platform, information instructing the identifier platform to generate specific identifier pairs based on the modified machine learning model and to compare the specific identifier pairs with the identifier pairs. As further shown in FIG. 1I, and by reference number 165, the identifier platform may generate specific identifier pairs based on the modified machine learning model. For example, the identifier platform may generate the specific identifier pairs in manner described above in connection with FIGS. 1B and 1C. As further shown in FIG. 1I, and by reference number 170, the identifier platform may determine that the modified machine learning model is not the machine learning model when the specific identifier pairs fail to substantially match the identifier pairs. In some implementations, the identifier platform may determine the authenticity of the modified machine learning model without reviewing code associated with the modified machine learning model.

As a particular example, the machine learning model may be an image classifier model, as described above. In this case, the identifier platform may determine that the modified image classifier model is not the image classifier model sold by the user based on determining that a threshold percentage of the pairs of class labels produced by the modified machine learning model are not the same as the pairs of class labels previously produced by the identifier platform based on the same input images. In this way, the second party may determine whether the modified machine learning model is inferior to the machine learning model or comparable to the machine learning model. If the modified machine learning model is inferior, the second party may take appropriate action against the first party (e.g., request a refund, sue, etc.).

Figure 1J:
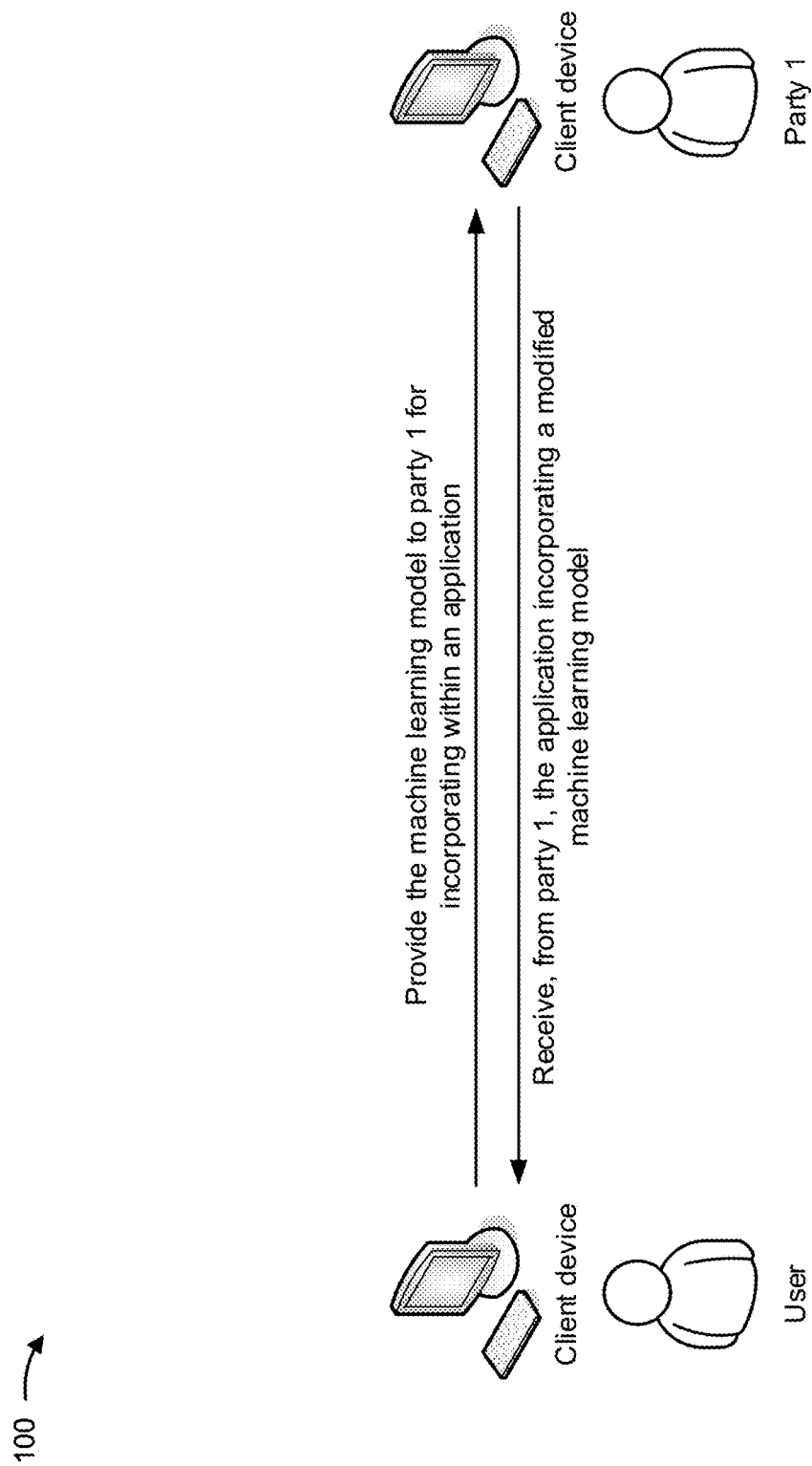

As shown in FIG. 1J, a user of the client device (e.g., a creator of a machine learning model) may provide the machine learning model to a first party (e.g., party 1) for incorporating within an application. For example, the user may provide the machine learning model to a developer for incorporation in an application created by the developer. The user may receive, from the first party, the application incorporating a modified machine learning model instead of the machine learning model provided by the user. For example, the first party may alter the machine learning model significantly before incorporating the machine learning model in the application. Because the identifier platform has, as described above, generated and stored identifier pairs associated with the machine learning model provided by the user, the identifier pairs can be used to determine that the modified machine learning model incorporated in the application provided by the first party is not the same as the machine learning model provided by the user.

Figure 1K:
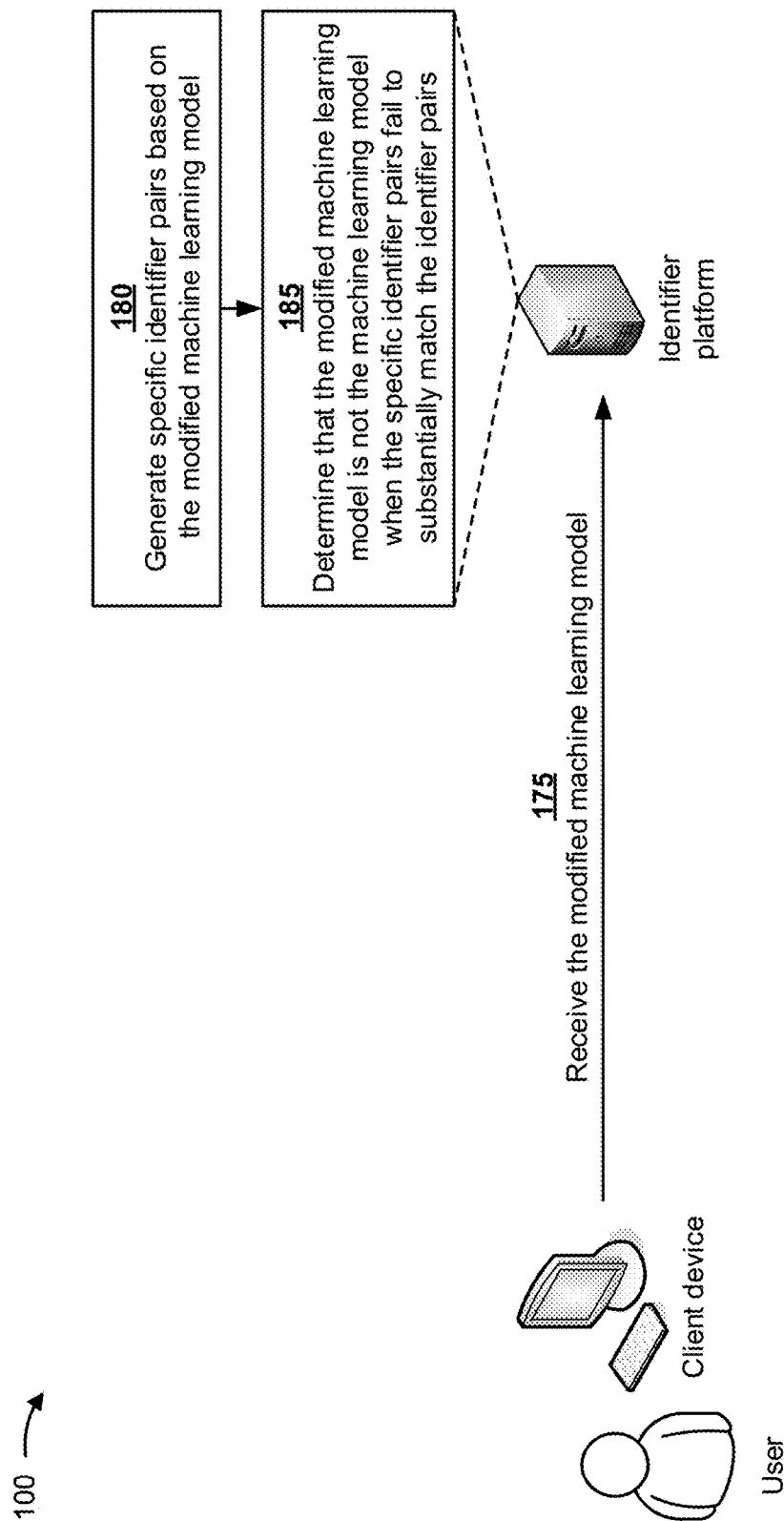

As shown in FIG. 1K, and by reference number 175, the identifier platform may receive the modified machine learning model. As further shown in FIG. 1K, and by reference number 180, the identifier platform may generate specific identifier pairs based on the modified machine learning model. For example, the identifier platform may generate the specific identifier pairs in manner described above in connection with FIGS. 1B and 1C. As further shown in FIG. 1K, and by reference number 185, the identifier platform may determine that the modified machine learning model is not the machine learning model when the specific identifier pairs fail to substantially match the identifier pairs. In some implementations, the identifier platform may determine the authenticity of the modified machine learning model without reviewing code associated with the modified machine learning model.

As a particular example, the machine learning model may be an image classifier model, as described above. In this case, the user, or a party associated with the user, may determine that a modified image classifier model is not the image classifier model provided by the user based on determining that a threshold percentage of the pairs of class labels produced by the modified machine learning model are not the same as the pairs of class labels previously produced by the identifier platform based on the same input images. In this way, the user may determine whether the modified machine learning model is inferior to the machine learning model or comparable to the machine learning model. If the modified machine learning model is inferior, the user may take appropriate action against the first party (e.g., request a refund, sue, etc.).

In some implementations, the user (e.g., the client device) and/or the identifier platform may provide the machine learning model to client devices associated with other parties (e.g., as described in FIGS. 1F-1K) via transactions. For example, the user may utilize the identifier platform to sell a machine learning model to the first party, and the identifier platform may perform a transaction for the sale. In some implementations, the identifier platform may generate a block for a blockchain that includes information associated with the transaction, and may add the block to the blockchain. The blockchain providing the information associated with the transaction may include a continuously growing list of records, called blocks, which are linked and secured using cryptography. Each block contains a hash pointer as a link to a previous block, a timestamp, and transaction data (e.g., each block may include many transactions). By design, a blockchain is inherently resistant to modification of the transaction data. A blockchain may be managed by a peer-to-peer network of nodes (e.g., devices) collectively adhering to a consensus protocol for validating new blocks. Once recorded, the transaction data in a given block cannot be altered retroactively without the alteration of all previous blocks, which requires collusion of a majority of the network nodes. A blockchain is an append-only data structure maintained by a network of nodes that do not fully trust each other. All nodes in a blockchain network agree on an ordered set of blocks, and each block may contain multiple transactions. Thus, a blockchain may be viewed as a log of ordered transactions.

In this way, several different stages of the process for utilizing models to generate identifiers that identify and provide authentication for machine learning models are automated, which may remove human subjectivity and waste from the process, and which may improve speed and efficiency of the process and conserve computing resources (e.g., processing resources, memory resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that automatically utilizes models to generate identifiers that identify and provide authentication for machine learning models. Finally, automating the process for utilizing models to generate identifiers that identify and provide authentication for machine learning models conserves computing resources (e.g., processing resources, memory resources, and/or the like), networking resources, and/or the like that would otherwise be wasted in attempting to provide authentication for machine learning models using less efficient techniques.

As indicated above, FIGS. 1A-1K are provided merely as examples. Other examples may differ from what is described with regard to FIGS. 1A-1K.

Figure 2:
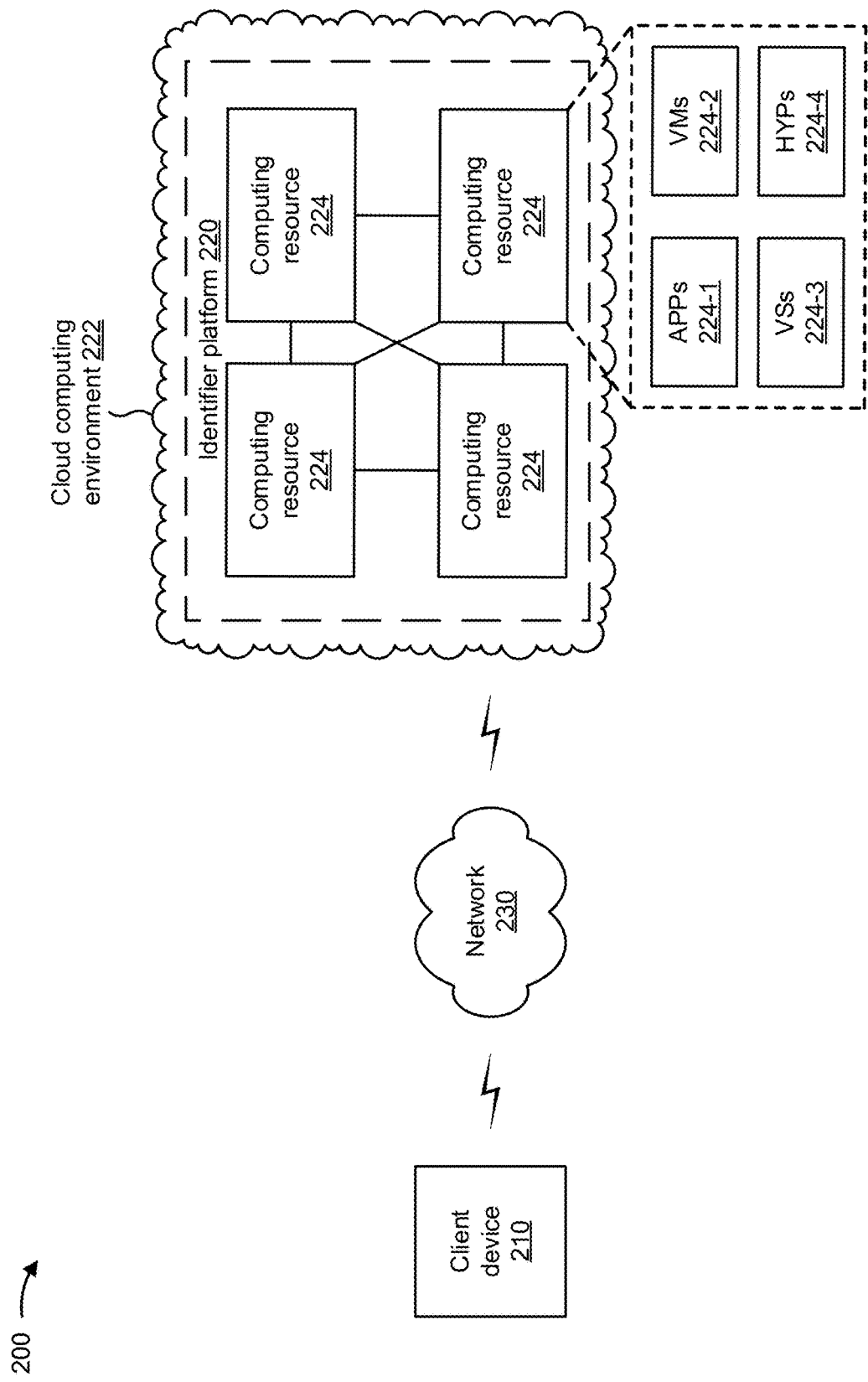
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an identifier platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to identifier platform 220.

Identifier platform 220 includes one or more devices that utilize models to generate identifiers that identify and provide authentication for machine learning models. In some implementations, identifier platform 220 may be designed to be modular such that certain software components may be swapped in or out depending on a particular need. As such, identifier platform 220 may be easily and/or quickly reconfigured for different uses. In some implementations, identifier platform 220 may receive information from and/or transmit information to one or more client devices 210.

In some implementations, as shown, identifier platform 220 may be hosted in a cloud computing environment 222. Notably, while implementations described herein describe identifier platform 220 as being hosted in cloud computing environment 222, in some implementations, identifier platform 220 may not be cloud-based (i.e., may be implemented outside of a cloud computing environment) or may be partially cloud-based.

Cloud computing environment 222 includes an environment that hosts identifier platform 220. Cloud computing environment 222 may provide computation, software, data access, storage, etc., services that do not require end-user knowledge of a physical location and configuration of system(s) and/or device(s) that hosts identifier platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host identifier platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with identifier platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of identifier platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
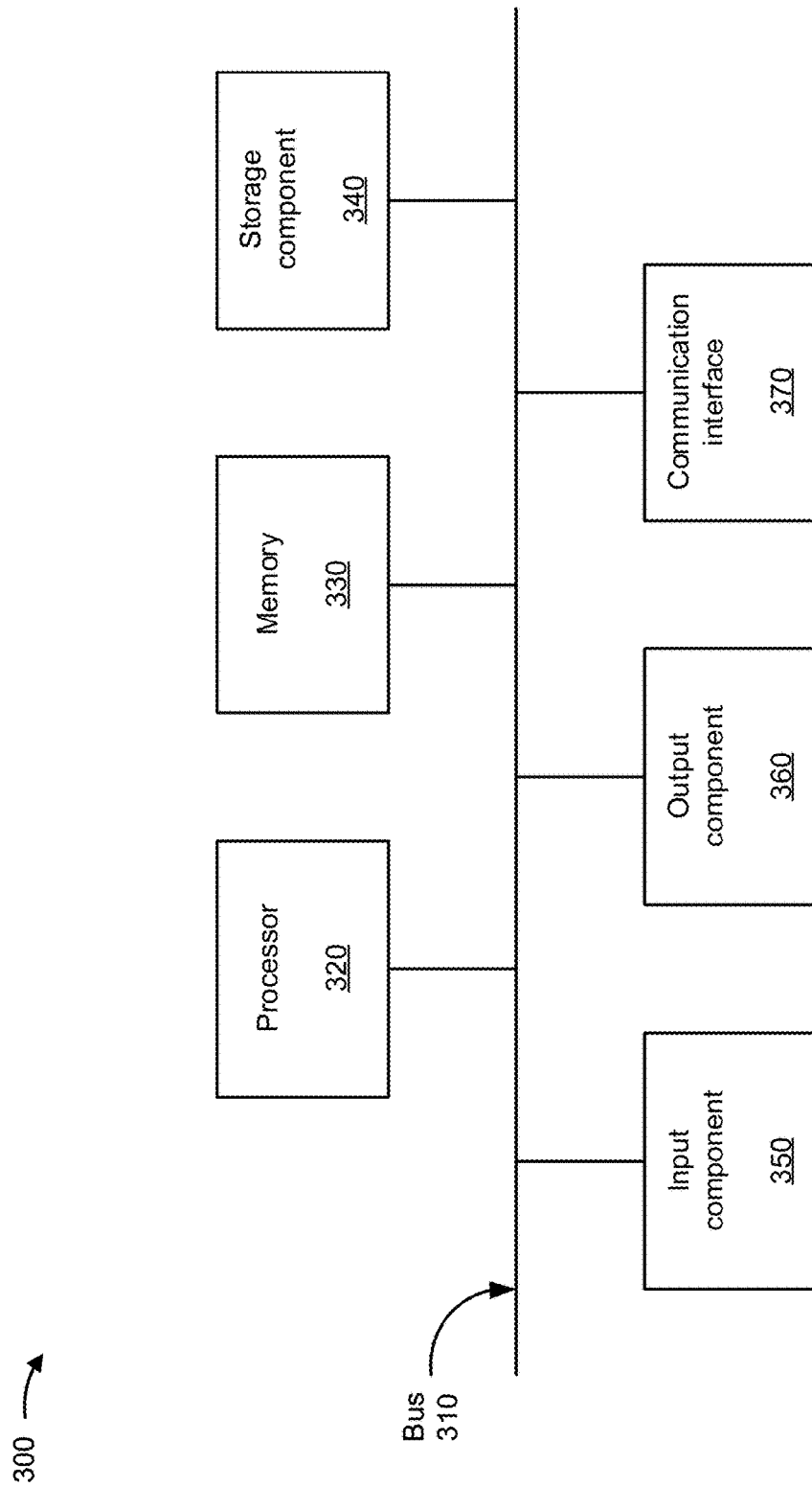
FIG. 3 is a diagram of example components of one or more devices of FIG. 2.

FIG. 3 is a diagram of example components of a device 300. Device 300 may correspond to client device 210, identifier platform 220, and/or computing resource 224. In some implementations, client device 210, identifier platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for utilizing models to generate identifiers that identify and provide authentication for machine learning models. In some implementations, one or more process blocks of FIG. 4 may be performed by an identifier platform (e.g., identifier platform 220). In some implementations, one or more process blocks of FIG. 4 may be performed by another device or a group of devices separate from or including the identifier platform, such as a client device (e.g., client device 210).

As shown in FIG. 4, process 400 may include receiving a machine learning model, model data associated with the machine learning model, and identifier generation data, wherein the model data includes data identifying a type of the machine learning model and specifications of the machine learning model, wherein the identifier generation data includes data utilized to generate identifier pairs for the machine learning model, and wherein each identifier pair includes substantially similar inputs, to the machine learning model, that cause the machine learning model to generate different outputs (block 410). For example, the identifier platform (e.g., using computing resource 224, processor 320, communication interface 370, and/or the like) may receive a machine learning model, model data associated with the machine learning model, and identifier generation data, as described above in connection with FIGS. 1A-2. In some aspects, the model data may include data identifying a type of the machine learning model and specifications of the machine learning model, and the identifier generation data may include data utilized to generate identifier pairs for the machine learning model. Each identifier pair may include substantially similar inputs, to the machine learning model, that cause the machine learning model to generate different outputs.

As further shown in FIG. 4, process 400 may include selecting an identifier model, for generating the identifier pairs, based on the machine learning model, the model data, and the identifier generation data (block 420). For example, the identifier platform (e.g., using computing resource 224, processor 320, memory 330, and/or the like) may select an identifier model, for generating the identifier pairs, based on the machine learning model, the model data, and the identifier generation data, as described above in connection with FIGS. 1A-2.

As further shown in FIG. 4, process 400 may include processing the machine learning model, the model data, and the identifier generation data, with the selected identifier model, to generate the identifier pairs and identifier pair data (block 430). For example, the identifier platform (e.g., using computing resource 224, processor 320, storage component 340, and/or the like) may process the machine learning model, the model data, and the identifier generation data, with the selected identifier model, to generate the identifier pairs and identifier pair data, as described above in connection with FIGS. 1A-2.

As further shown in FIG. 4, process 400 may include storing the identifier pairs and the identifier pair data in one or more data structures (block 440). For example, the identifier platform (e.g., using computing resource 224, processor 320, memory 330, storage component 340, and/or the like) may store the identifier pairs and the identifier pair data in one or more data structures, as described above in connection with FIGS. 1A-2.

As further shown in FIG. 4, process 400 may include utilizing the identifier pairs to identify and provide authentication for the machine learning model (block 450). For example, the identifier platform (e.g., using computing resource 224, processor 320, memory 330, communication interface 370, and/or the like) may utilize the identifier pairs to identify and provide authentication for the machine learning model, as described above in connection with FIGS. 1A-2.

Process 400 may include additional implementations, such as any single implementation or any combination of implementations described below and/or in connection with one or more other processes described elsewhere herein.

In some implementations, the identifier platform may store the identifier pairs in a scalable object data structure; may store, in a distributed ledger data structure, the model data, the identifier pair data, and a reference to the identifier pairs in the scalable object data structure; and may store, in an index data structure, the identifier pair data and a reference to the identifier pair data in the distributed ledger data structure.

In some implementations, the identifier platform may receive another machine learning model, and may generate specific identifier pairs based on the other machine learning model. The identifier platform may determine whether the specific identifier pairs substantially match the identifier pairs, and may determine that the other machine learning model matches the machine learning model when the specific identifier pairs are determined to substantially match the identifier pairs.

In some implementations, the identifier platform may receive, from a client device, a request to verify an authenticity of another machine learning model, and may generate specific identifier pairs based on the other machine learning model. The identifier platform may determine whether the specific identifier pairs substantially match the identifier pairs, and may determine whether the other machine learning model matches the machine learning model based on determining whether the specific identifier pairs substantially match the identifier pairs. The identifier platform may selectively verify the authenticity of the other machine learning model based on determining whether the other machine learning model matches the machine learning model, and may provide, to the client device, an indication of the authenticity of the other machine learning model based on the request and based on selectively verifying the authenticity of the other machine learning model.

In some implementations, the identifier platform may receive a modified machine learning model, and may generate specific identifier pairs based on the modified machine learning model. The identifier platform may determine whether the specific identifier pairs substantially match the identifier pairs, and may determine that the modified machine learning model is different than the machine learning model when the specific identifier pairs fail to substantially match the identifier pairs. The identifier platform may provide information indicating that the modified machine learning model is different than the machine learning model.

In some implementations, the identifier platform may receive a modified machine learning model, and may generate specific identifier pairs based on the modified machine learning model. The identifier platform may determine whether the specific identifier pairs substantially match the identifier pairs, and may determine that the modified machine learning model is different than the machine learning model when the specific identifier pairs fail to substantially match the identifier pairs. The identifier platform may provide information indicating that the modified machine learning model is inappropriately generated and incorporated in a software application based on the modified machine learning model being different than the machine learning model.

In some implementations, the machine learning model may include an image classifier model, an object detector model, a natural language-based classifier model, a time series forecaster model, and/or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for utilizing models to generate identifiers that identify and provide authentication for machine learning models. In some implementations, one or more process blocks of FIG. 5 may be performed by an identifier platform (e.g., identifier platform 220). In some implementations, one or more process blocks of FIG. 5 may be performed by another device or a group of devices separate from or including the identifier platform, such as a client device (e.g., client device 210).

As shown in FIG. 5, process 500 may include selecting an identifier model, for generating identifier pairs, based on a machine learning model, model data associated with the machine learning model, and identifier generation data, wherein the model data includes data identifying a type of the machine learning model and specifications of the machine learning model, wherein the identifier generation data includes data utilized to generate identifier pairs for the machine learning model, and wherein each identifier pair includes substantially similar inputs, to the machine learning model, that cause the machine learning model to generate different outputs (block 510). For example, the identifier platform (e.g., using computing resource 224, processor 320, memory 330, communication interface 370, and/or the like) may select an identifier model, for generating identifier pairs, based on a machine learning model, model data associated with the machine learning model, and identifier generation data, as described above in connection with FIGS. 1A-2. In some aspects, the model data includes data identifying a type of the machine learning model and specifications of the machine learning model, and the identifier generation data includes data utilized to generate identifier pairs for the machine learning model. In some aspects, each identifier pair includes substantially similar inputs, to the machine learning model, that cause the machine learning model to generate different outputs.

As further shown in FIG. 5, process 500 may include processing the machine learning model, the model data, and the identifier generation data, with the selected identifier model, to generate the identifier pairs and identifier pair data (block 520). For example, the identifier platform (e.g., using computing resource 224, processor 320, storage component 340, and/or the like) may process the machine learning model, the model data, and the identifier generation data, with the selected identifier model, to generate the identifier pairs and identifier pair data, as described above in connection with FIGS. 1A-2.

As further shown in FIG. 5, process 500 may include storing the identifier pairs and the identifier pair data in one or more data structures (block 530). For example, the identifier platform (e.g., using computing resource 224, processor 320, memory 330, storage component 340, and/or the like) may store the identifier pairs and the identifier pair data in one or more data structures, as described above in connection with FIGS. 1A-2.

As further shown in FIG. 5, process 500 may include receiving, from a client device, a request to verify an authenticity of another machine learning model (block 540). For example, the identifier platform (e.g., using computing resource 224, processor 320, communication interface 370, and/or the like) may receive, from a client device, a request to verify an authenticity of another machine learning model, as described above in connection with FIGS. 1A-2.

As further shown in FIG. 5, process 500 may include selectively verifying the authenticity of the other machine learning model based on the identifier pairs, wherein the authenticity of the other machine learning model is verified when specific identifier pairs associated with the other machine learning model substantially match the identifier pairs, and wherein the authenticity of the other machine learning model is not verified when the specific identifier pairs associated with the other machine learning model fail to substantially match the identifier pairs (block 550). For example, the identifier platform (e.g., using computing resource 224, processor 320, memory 330, and/or the like) may selectively verify the authenticity of the other machine learning model based on the identifier pairs, as described above in connection with FIGS. 1A-2. In some aspects, the authenticity of the other machine learning model is verified when specific identifier pairs associated with the other machine learning model substantially match the identifier pairs. In some aspects, the authenticity of the other machine learning model is not verified when the specific identifier pairs associated with the other machine learning model fail to substantially match the identifier pairs.

As further shown in FIG. 5, process 500 may include providing, to the client device, an indication of the authenticity of the other machine learning model based on the request and based on selectively verifying the authenticity of the other machine learning model (block 560). For example, the identifier platform (e.g., using computing resource 224, processor 320, storage component 340, communication interface 370, and/or the like) may provide, to the client device, an indication of the authenticity of the other machine learning model based on the request and based on selectively verifying the authenticity of the other machine learning model, as described above in connection with FIGS. 1A-2.

Process 500 may include additional implementations, such as any single implementation or any combination of implementations described below and/or in connection with one or more other processes described elsewhere herein.

In some implementations, the identifier platform may receive a modified machine learning model, and may generate specific identifier pairs based on the modified machine learning model. The identifier platform may determine whether the specific identifier pairs substantially match the identifier pairs, and may determine that the modified machine learning model is different than the machine learning model when the specific identifier pairs fail to substantially match the identifier pairs. The modified machine learning model may be determined to be illegally generated when the modified machine learning model is determined to be different than the machine learning model.

In some implementations, the identifier platform may receive a modified machine learning model, and may generate specific identifier pairs based on the modified machine learning model. The identifier platform may determine whether the specific identifier pairs substantially match the identifier pairs, and may determine that the modified machine learning model is different than the machine learning model when the specific identifier pairs fail to substantially match the identifier pairs. The modified machine learning model may be determined to be inappropriately generated and incorporated in a software application when the modified machine learning model is determined to be different than the machine learning model.

In some implementations, the selected identifier model may include one of a gradient ascent model or a loss function model. In some implementations, an identifier pair, of the identifier pairs, may include a first set that includes a first input and a first class label generated by the machine learning model based on an input to the machine learning model, and a second set that includes a second input and a second class label generated by the machine learning model based on the input to the machine learning model. The first input and the second input may be substantially similar, and the first class label and the second class label may be different.

In some implementations, the identifier platform may provide the machine learning model to the client device via a transaction, may generate a block for a blockchain that includes information associated with the transaction, and may add the block to the blockchain. In some implementations, the identifier platform may identify the machine learning model based on the identifier pairs and without reviewing code associated with the machine learning model.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing models to generate identifiers that identify and provide authentication for machine learning models. In some implementations, one or more process blocks of FIG. 6 may be performed by an identifier platform (e.g., identifier platform 220). In some implementations, one or more process blocks of FIG. 6 may be performed by another device or a group of devices separate from or including the identifier platform, such as a client device (e.g., client device 210).

As shown in FIG. 6, process 600 may include receiving a machine learning model (block 610). For example, the identifier platform (e.g., using computing resource 224, processor 320, communication interface 370, and/or the like) may receive a machine learning model, as described above in connection with FIGS. 1A-2.

As further shown in FIG. 6, process 600 may include receiving model data associated with the machine learning model, wherein the model data includes data identifying a type of the machine learning model and specifications of the machine learning model (block 620). For example, the identifier platform (e.g., using computing resource 224, processor 320, communication interface 370, and/or the like) may receive model data associated with the machine learning model, as described above in connection with FIGS. 1A-2. In some aspects, the model data includes data identifying a type of the machine learning model and specifications of the machine learning model.

As further shown in FIG. 6, process 600 may include receiving identifier generation data that includes data utilized to generate identifier pairs for the machine learning model, wherein each identifier pair includes substantially similar inputs, to the machine learning model, that cause the machine learning model to generate different outputs (block 630). For example, the identifier platform (e.g., using computing resource 224, processor 320, communication interface 370, and/or the like) may receive identifier generation data that includes data utilized to generate identifier pairs for the machine learning model, as described above in connection with FIGS. 1A-2. In some aspects, each identifier pair includes substantially similar inputs, to the machine learning model, that cause the machine learning model to generate different outputs.

As further shown in FIG. 6, process 600 may include selecting an identifier model, for generating the identifier pairs, based on the machine learning model, the model data, and the identifier generation data (block 640). For example, the identifier platform (e.g., using computing resource 224, processor 320, memory 330, and/or the like) may select an identifier model, for generating the identifier pairs, based on the machine learning model, the model data, and the identifier generation data, as described above in connection with FIGS. 1A-2.

As further shown in FIG. 6, process 600 may include processing the machine learning model, the model data, and the identifier generation data, with the selected identifier model, to generate the identifier pairs and identifier pair data (block 650). For example, the identifier platform (e.g., using computing resource 224, processor 320, storage component 340, and/or the like) may process the machine learning model, the model data, and the identifier generation data, with the selected identifier model, to generate the identifier pairs and identifier pair data, as described above in connection with FIGS. 1A-2.

As further shown in FIG. 6, process 600 may include performing one or more actions based on the identifier pairs and the identifier pair data (block 660). For example, the identifier platform (e.g., using computing resource 224, processor 320, memory 330, storage component 340, communication interface 370, and/or the like) may perform one or more actions based on the identifier pairs and the identifier pair data, as described above in connection with FIGS. 1A-2.

Process 600 may include additional implementations, such as any single implementation or any combination of implementations described below and/or in connection with one or more other processes described elsewhere herein.

In some implementations, the identifier platform may receive another machine learning model, and may generate specific identifier pairs based on the other machine learning model. The identifier platform may determine whether the specific identifier pairs substantially match the identifier pairs, and may determine that the other machine learning model matches the machine learning model when the specific identifier pairs are determined to substantially match the identifier pairs. The other machine learning model may be determined to be illegally obtained when the other machine learning model matches the machine learning model.

In some implementations, the identifier platform may receive a modified machine learning model, and may generate specific identifier pairs based on the modified machine learning model. The identifier platform may determine whether the specific identifier pairs substantially match the identifier pairs, and may determine that the modified machine learning model is different than the machine learning model when the specific identifier pairs fail to substantially match the identifier pairs. The modified machine learning model may be determined to be illegally generated or inappropriately generated and incorporated in a software application when the modified machine learning model is determined to be different than the machine learning model.

In some implementations, the selected identifier model may include one of a gradient ascent model or a loss function model. In some implementations, an identifier pair, of the identifier pairs, may include a first set that includes a first input and a first class label generated by the machine learning model based on an input to the machine learning model, and a second set that includes a second input and a second class label generated by the machine learning model based on the input to the machine learning model. The first input and the second input may be substantially similar, and the first class label and the second class label may be different.

In some implementations, the identifier platform may provide the machine learning model to a client device via a transaction, may generate a block for a blockchain that includes information associated with the transaction, and may add the block to the blockchain.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a machine learning model, model data associated with the machine learning model, and identifier generation data,
   wherein the model data includes data identifying a type of the machine learning model and specifications of the machine learning model, and
   wherein the identifier generation data includes data utilized to generate identifier pairs for the machine learning model,
   wherein each identifier pair includes substantially similar inputs, to the machine learning model, that cause the machine learning model to generate different outputs;
   selecting, by the device, an identifier model, for generating the identifier pairs, based on the machine learning model, the model data, and the identifier generation data;
   processing, by the device, the machine learning model, the model data, and the identifier generation data, with the selected identifier model, to generate the identifier pairs and identifier pair data;
   storing, by the device, the identifier pairs and the identifier pair data in one or more data structures; and
   utilizing, by the device, the identifier pairs to identify and provide authentication for the machine learning model.

2. The method of claim 1, wherein storing the identifier pairs and the identifier pair data comprises:
   storing the identifier pairs in a scalable object data structure;
   storing, in a distributed ledger data structure, the model data, the identifier pair data, and a reference to the identifier pairs in the scalable object data structure; and
   storing, in an index data structure, the identifier pair data and a reference to the identifier pair data in the distributed ledger data structure.

3. The method of claim 1, wherein utilizing the identifier pairs to identify and provide authentication for the machine learning model comprises:
- receiving another machine learning model;
- generating specific identifier pairs based on the other machine learning model;
- determining whether the specific identifier pairs substantially match the identifier pairs; and
- determining that the other machine learning model matches the machine learning model when the specific identifier pairs are determined to substantially match the identifier pairs,
  - wherein the other machine learning model is determined to be illegally obtained when the other machine learning model matches the machine learning model.

4. The method of claim 1, wherein utilizing the identifier pairs to identify and provide authentication for the machine learning model comprises:
- receiving, from a client device, a request to verify an authenticity of another machine learning model;
- generating specific identifier pairs based on the other machine learning model;
- determining whether the specific identifier pairs substantially match the identifier pairs;
- determining whether the other machine learning model matches the machine learning model based on determining whether the specific identifier pairs substantially match the identifier pairs,
  - wherein the other machine learning model matches the machine learning model when the specific identifier pairs substantially match the identifier pairs, and
  - wherein the other machine learning model does not match the machine learning model when the specific identifier pairs fail to substantially match the identifier pairs;
- selectively verifying the authenticity of the other machine learning model based on determining whether the other machine learning model matches the machine learning model,
  - wherein the authenticity of the other machine learning model is verified when the other machine learning model matches the machine learning model, and
  - wherein the authenticity of the other machine learning model is not verified when the other machine learning model does not match the machine learning model; and
- providing, to the client device, an indication of the authenticity of the other machine learning model based on the request and based on selectively verifying the authenticity of the other machine learning model.

5. The method of claim 1, wherein utilizing the identifier pairs to identify and provide authentication for the machine learning model comprises:
- receiving a modified machine learning model;
- generating specific identifier pairs based on the modified machine learning model;
- determining whether the specific identifier pairs substantially match the identifier pairs;
- determining that the modified machine learning model is different than the machine learning model when the specific identifier pairs fail to substantially match the identifier pairs; and
- providing information indicating that the modified machine learning model is different than the machine learning model.

6. The method of claim 1, wherein utilizing the identifier pairs to identify and provide authentication for the machine learning model comprises:
- receiving a modified machine learning model;
- generating specific identifier pairs based on the modified machine learning model;
- determining whether the specific identifier pairs substantially match the identifier pairs;
- determining that the modified machine learning model is different than the machine learning model when the specific identifier pairs fail to substantially match the identifier pairs; and
- providing information indicating that the modified machine learning model is inappropriately generated and incorporated in a software application based on the modified machine learning model being different than the machine learning model.

7. The method of claim 1, wherein the machine learning model includes at least one of:
- an image classifier model,
- an object detector model,
- a natural language-based classifier model, or
- a time series forecaster model.

8. A device, comprising:
- one or more memories; and
- one or more processors, communicatively coupled to the one or more memories, to:
  - select an identifier model, for generating identifier pairs, based on a machine learning model, model data associated with the machine learning model, and identifier generation data,
    - wherein the model data includes data identifying a type of the machine learning model and specifications of the machine learning model, and
    - wherein the identifier generation data includes data utilized to generate identifier pairs for the machine learning model,
      - wherein each identifier pair includes substantially similar inputs, to the machine learning model, that cause the machine learning model to generate different outputs;
  - process the machine learning model, the model data, and the identifier generation data, with the selected identifier model, to generate the identifier pairs and identifier pair data;
  - store the identifier pairs and the identifier pair data in one or more data structures;
  - receive, from a client device, a request to verify an authenticity of another machine learning model;
  - selectively verify the authenticity of the other machine learning model based on the identifier pairs,
    - wherein the authenticity of the other machine learning model is verified when specific identifier pairs associated with the other machine learning model substantially match the identifier pairs, and
    - wherein the authenticity of the other machine learning model is not verified when the specific identifier pairs associated with the other machine learning model fail to substantially match the identifier pairs; and
  - provide, to the client device, an indication of the authenticity of the other machine learning model based on the request and based on selectively verifying the authenticity of the other machine learning model.

9. The device of claim 8, wherein the one or more processors are further to:
receive a modified machine learning model;
generate specific identifier pairs based on the modified machine learning model;
determine whether the specific identifier pairs substantially match the identifier pairs; and
determine that the modified machine learning model is different than the machine learning model when the specific identifier pairs fail to substantially match the identifier pairs,
wherein the modified machine learning model is determined to be illegally generated when the modified machine learning model is determined to be different than the machine learning model.

10. The device of claim 8, wherein the one or more processors are further to:
receive a modified machine learning model;
generate specific identifier pairs based on the modified machine learning model;
determine whether the specific identifier pairs substantially match the identifier pairs; and
determine that the modified machine learning model is different than the machine learning model when the specific identifier pairs fail to substantially match the identifier pairs,
wherein the modified machine learning model is determined to be inappropriately generated and incorporated in a software application when the modified machine learning model is determined to be different than the machine learning model.

11. The device of claim 8, wherein the selected identifier model includes one of:
a gradient ascent model, or
a loss function model.

12. The device of claim 8, wherein an identifier pair, of the identifier pairs, includes:
a first set that includes a first input and a first class label generated by the machine learning model based on an input to the machine learning model, and
a second set that includes a second input and a second class label generated by the machine learning model based on the input to the machine learning model,
wherein the first input and the second input are substantially similar, and
wherein the first class label and the second class label are different.

13. The device of claim 8, wherein the one or more processors are further to:
provide the machine learning model to the client device via a transaction;
generate a block for a blockchain that includes information associated with the transaction; and
add the block to the blockchain.

14. The device of claim 8, wherein the one or more processors are further to:
identify the machine learning model based on the identifier pairs and without reviewing code associated with the machine learning model.

15. A non-transitory computer-readable medium storing instructions, the instructions comprising:
one or more instructions that, when executed by one or more processors, cause the one or more processors to:
receive a machine learning model;
receive model data associated with the machine learning model,
wherein the model data includes data identifying a type of the machine learning model and specifications of the machine learning model;
receive identifier generation data that includes data utilized to generate identifier pairs for the machine learning model,
wherein each identifier pair includes substantially similar inputs, to the machine learning model, that cause the machine learning model to generate different outputs;
select an identifier model, for generating the identifier pairs, based on the machine learning model, the model data, and the identifier generation data;
process the machine learning model, the model data, and the identifier generation data, with the selected identifier model, to generate the identifier pairs and identifier pair data; and
perform one or more actions based on the identifier pairs and the identifier pair data.

16. The non-transitory computer-readable medium of claim 15, wherein the one or more instructions, that cause the one or more processors to perform the one or more actions, cause the one or more processors to:
receive another machine learning model;
generate specific identifier pairs based on the other machine learning model;
determine whether the specific identifier pairs substantially match the identifier pairs; and
determine that the other machine learning model matches the machine learning model when the specific identifier pairs are determined to substantially match the identifier pairs,
wherein the other machine learning model is determined to be illegally obtained when the other machine learning model matches the machine learning model.

17. The non-transitory computer-readable medium of claim 15, wherein the one or more instructions, that cause the one or more processors to perform the one or more actions, cause the one or more processors to:
receive a modified machine learning model;
generate specific identifier pairs based on the modified machine learning model;
determine whether the specific identifier pairs substantially match the identifier pairs; and
determine that the modified machine learning model is different than the machine learning model when the specific identifier pairs fail to substantially match the identifier pairs,
wherein the modified machine learning model is determined to be illegally generated or inappropriately generated and incorporated in a software application when the modified machine learning model is determined to be different than the machine learning model.

18. The non-transitory computer-readable medium of claim 15, wherein the selected identifier model includes one of:
a gradient ascent model, or
a loss function model.

19. The non-transitory computer-readable medium of claim 15, wherein an identifier pair, of the identifier pairs, includes:
a first set that includes a first input and a first class label generated by the machine learning model based on an input to the machine learning model, and a second set that includes a second input and a second class label generated by the machine learning model based on the input to the machine learning model,
    wherein the first input and the second input are substantially similar, and
    wherein the first class label and the second class label are different.

20. The non-transitory computer-readable medium of claim 15, wherein the instructions further comprise:
    one or more instructions that, when executed by the one or more processors, cause the one or more processors to:
        provide the machine learning model to a client device via a transaction;
        generate a block for a blockchain that includes information associated with the transaction; and
        add the block to the blockchain.

\* \* \* \* \*